(12) United States Patent
Bennett

(10) Patent No.: US 6,288,315 B1
(45) Date of Patent: Sep. 11, 2001

(54) METHOD AND APPARATUS FOR MUSICAL TRAINING

(76) Inventor: Morgan Bennett, 1424 10th St., Apt 1, Santa Monica, CA (US) 90401

( * ) Notice: Subject to any disclaimer, the term of this patent is extended or adjusted under 35 U.S.C. 154(b) by 0 days.

(21) Appl. No.: 09/426,478

(22) Filed: Oct. 26, 1999

Related U.S. Application Data

(63) Continuation-in-part of application No. 09/386,258, filed on Aug. 31, 1999, which is a continuation of application No. 08/920,059, filed on Aug. 26, 1997, now Pat. No. 5,945,618.

(51) Int. Cl.$^7$ .................................................. G09B 15/02
(52) U.S. Cl. ..................................... 84/470 R; 84/471 SR
(58) Field of Search ............................ 84/470 R–471 SR

(56) References Cited

U.S. PATENT DOCUMENTS

| | | | | |
|---|---|---|---|---|
| 3,841,192 | * | 10/1974 | Leonard | 84/474 X |
| 4,305,323 | * | 12/1981 | Graham | 84/474 |
| 4,716,806 | * | 1/1988 | Forrest | 84/474 |
| 4,960,029 | * | 10/1990 | Nelson | 84/473 |
| 4,961,362 | * | 10/1990 | Gunn | 84/474 |
| 5,386,757 | * | 2/1995 | Derrick | 84/471 SR X |
| 5,524,522 | * | 6/1996 | Hesnan | 84/471 SR X |
| 6,031,172 | * | 2/2000 | Papadopoulos | 84/470 R |

* cited by examiner

*Primary Examiner*—Jeffrey Donels
(74) *Attorney, Agent, or Firm*—Mitchell Silberberg & Knupp LLP

(57) ABSTRACT

Provided is an apparatus directed to identifying desired combinations of musical notes. The apparatus includes a base imprinted with plural different indicia, each different indicium corresponding to a different musical note. For example, the indicia might include musical symbols (e.g., C or G♯/A♭) and/or might include a different color or combination of colors for each note. A template having plural windows may be disposed over the base so as to selectively view plural of the different indicia. It is a feature of the invention that the template corresponds to a particular characteristic, such as the major scales or the minor ninth chords, and different positions of the template relative to the base reveal different sets of musical notes having said characteristic. For example, one position of the template might reveal the C major scale and another might reveal the A♯/B♭ major scale.

22 Claims, 13 Drawing Sheets

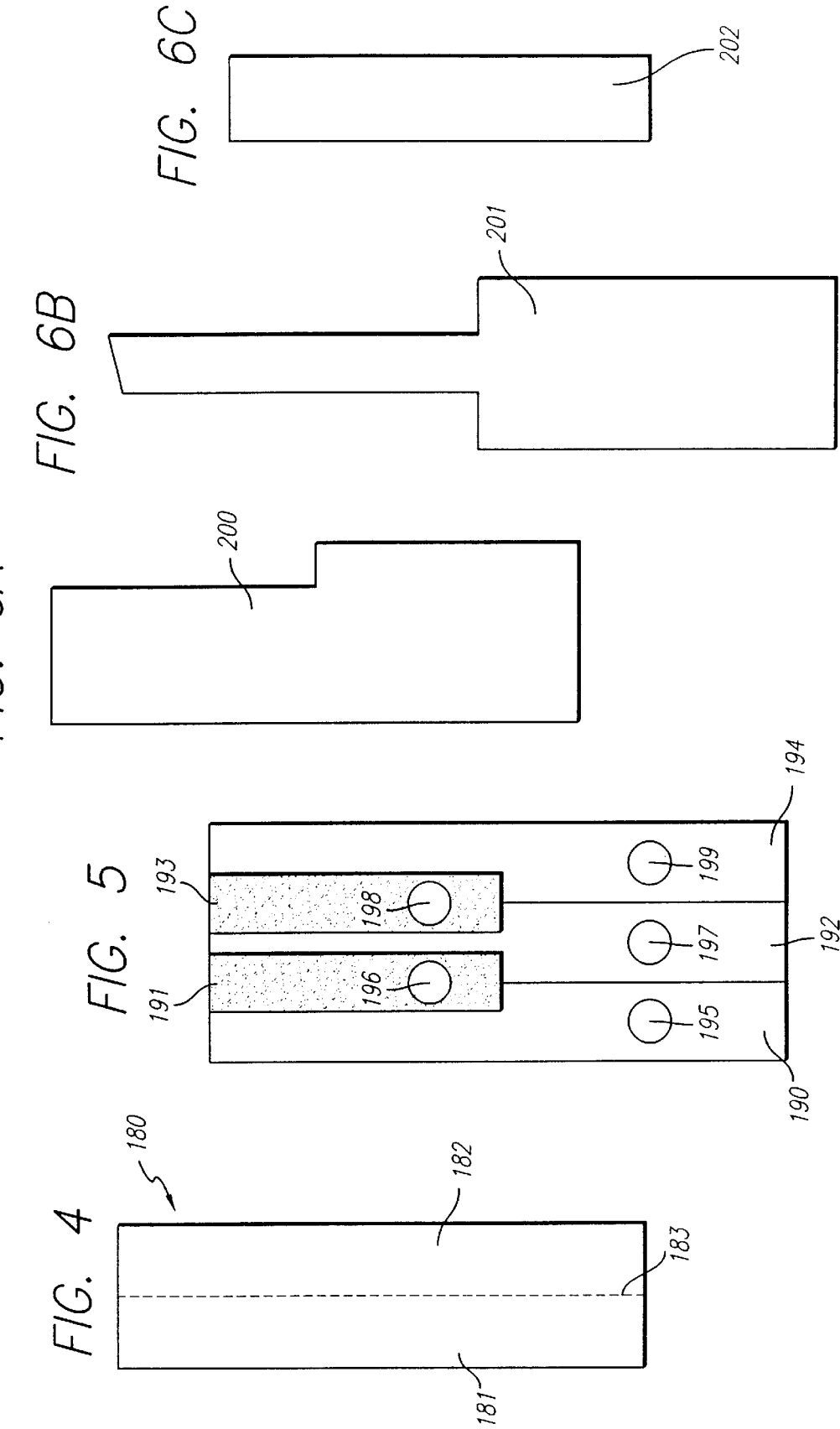

METHOD AND APPARATUS FOR MUSICAL TRAINING

This application is a continuation-in-part of U.S. patent application Ser. No. 09/386,258, which was filed on Aug. 31, 1999 and was a continuation of U.S. patent application Ser. No. 08/920,059, which was filed on Aug. 26, 1997, and issued as U.S. Pat. No. 5,945,618 on Aug. 31, 1999. The foregoing application and patent are incorporated herein by reference as though set forth herein in full.

BACKGROUND OF THE INVENTION

1. Field of the Invention

The present invention relates to identifying combinations of musical notes, such as scales and chords, and particularly relates to an apparatus utilizing a template for identifying such combinations.

2. Description of Related Art

A musical instrument generally comprises a plurality of note playing means. The most common note playing means are keys (such as the keys of a piano) and strings (such as the strings of a guitar). Generally, there is a surface corresponding to the note playing means which can be viewed by the person playing the musical instrument when the note playing means is played. For example, a piano key has a top surface which is pressed in order to play the key. A guitar has a fingerboard surface below the strings.

Keyboard musical instruments come in all shapes and sizes and produce sound in many different ways. Well known keyboard instruments include pianos (electric and non-electric), organs, harpsichords, spinets, clavichords, synthesizers and accordions. Reference is made to FIG. 1, which shows part of a conventional piano keyboard. The keyboard has white keys and black keys. Each key, when pressed, produces a corresponding tone. The white keys correspond to what are commonly known as diatonic tones or notes and the black keys correspond to what are commonly known as chromatic tones or notes.

With respect to FIG. 1, the white keys include a C key 1, a D key 2, an E key 3, an F key 4, a G key 5, an A key 6 and a B key 7. The black keys include a C♯/D♭ key 8, a D♯/Eb key 9, an F♯/Gb key 10, a G♯/A♭ key 11, and an A♯/B♭ key 12. Piano keys numbered on FIG. 1 as 1 through 12 constitute an octave.

Also shown in FIG. 1 is a second and higher octave. This second octave includes a C key 21, a D key 22, an E key 23, an F key 24, a G key 25, an A key 26 and a B key 27. The black keys included in the second octave are a C♯/D♭ key 28, a D♯/Eb key 29, an F♯/Gb key 30, a G♯/A♭ key 31, and an A♯/B♭ 32. C key 1, for example, is one octave lower than C key 21.

It is important to distinguish the meanings of "note" and "pitch." The C key 1 and the C key 21 play the same "note." However, the same two piano keys play tones with different "pitches" because the two keys are an octave apart.

Furthermore, "half-step" means one tone higher or lower. For example, the B key 7 is a half-step lower than the C key 21. The D♯/Eb key is one half-step higher than the D key. A "whole step" constitutes two consecutive half steps. For example, the C key 1 is one whole step lower than the D key 2, because the C♯/D♭ key 8 is between said C and D keys.

Another important concept in music is that of the scale. There are many different types of scales, but the most notable are the major, minor and blues scales. The major scale is the most familiar. In playing a major scale, one would play the following notes in the following order:

1. The central note (for the C major scale, for example, the central note is "C");
2. a second note, which is the note one whole step higher than the central note (i.e., "D" for the C major scale);
3. a third note, which is one whole step higher than the second note (i.e., "E" for the C major scale);
4. a fourth note, which is one half step higher than the third note (i.e., "F" for the C major scale);
5. a fifth note, which is one whole step higher than the fourth note (i.e., "G" for the C major scale);
6. a sixth note, which is one whole step higher than the fifth note (i.e., "A" for the C major scale);
7. a seventh note, which is one whole step higher than the sixth note (i.e., "B" for the C major scale); and
8. the central note, which is played one half-step higher than the seventh note (i.e., "C" for the C major scale, except one octave higher than the initial C note played). Therefore, to play the C major scale, one could play the following keys from FIG. 1 in the following order: 1; 2; 3; 4; 5; 6; 7; and 21.

Using the same formula for a major scale, to play the G major scale, one would play G, A, B, C, D, E, F♯, then G (one octave higher this time) again. These notes follow the same relationship of central note, whole step, whole step, half step, whole step, whole step, whole step, then half step to central note one octave higher than the first. Similarly, to play the F major scale, one would play F, G, A, B♭, C, D, E, F.

The minor scale is also important in music. In playing a minor scale, one would play the following notes in the following order:

1. The central note (for the A minor scale, for example, the central note is "A");
2. a second note, which is the note one whole step higher than the central note (i.e., "B" for the A minor scale);
3. a third note, which is one half step higher than the second note (i.e., "C" for the A minor scale);
4. a fourth note, which is one whole step higher than the third note (i.e., "D" for the A minor scale);
5. a fifth note, which is one whole step higher than the fourth note (i.e., "E" for the A minor scale);
6. a sixth note, which is one half step higher than the fifth note (i.e., "F" for the A minor scale);
7. a seventh note, which is one whole step higher than the sixth note (i.e., "G" for the A minor scale); and
8. the central note, which is played one whole step higher than the seventh note (i.e., "A" for the A minor scale, except one octave higher than the initial A note played). Therefore, to play the A minor scale, one could play the following keys from FIG. 1 in the following order: 6; 7; 21; 22; 23; 24; 25; and 26.

Using the same formula for a minor scale, to play the E minor scale, one would play E, F♯, G, A, B, C, D, and E (one octave higher than the first E). These notes have the same relationship of central note, whole step, half step, whole step, whole step, half step, whole step, whole step to central note one octave higher than the first. Similarly, to play the D minor scale, one would play D, E, F, G, A, B♭, C, D.

In playing the blues scale, six notes are played, rather than eight. The pattern for the blues scale is (1) central note, (2) whole and half step (i.e., 3 half steps), (3) whole step, (4) whole step, (5) whole and half step, and (6) whole step to the central note one octave higher than the first. Therefore, for example, the A blues scale would be played A, C, D, E, G, and A. The E blues scale would be played E, G, A, B, D and E.

A number of notation systems have been developed to indicate the pitches of notes. The most common is reflected by FIG. 2. This notation system uses upper and lower letters in conjunction with apostrophes to show which pitch is meant. As shown in FIG. 2, "middle C" is denoted "c". "c" is the note "C" with a pitch one octave lower than middle C. "c'" is the note "C" with a pitch one octave higher than middle C.

In FIG. 2, the two basic clefs are reflected, the bass clef 50 and the treble clef 51. Also shown are the C and B notes from C" to c"". Table 1 below lists the pitches and their identifying number.

TABLE 1

| NUMBER | PITCH |
|---|---|
| 52 | C" |
| 53 | B" |
| 54 | C' |
| 55 | B' |
| 56 | C |
| 57 | B |
| 58 | c |
| 59 | b |
| 60 | c' |
| 61 | b' |
| 62 | c" |
| 63 | b" |
| 64 | c'" |
| 65 | b'" |
| 66 | c"" |

As mentioned above, keyboard instruments produce sounds in different ways. Many non-electric keyboard instruments further comprise strings corresponding to the keys of the keyboard, such that when a key is pressed a corresponding string is either plucked or hit to make a desired sound. Each key in a non-electric piano, for example, has a corresponding hammer which strikes a corresponding string when the key is pressed. In a harpsichord, a slender fork-shaped jack is fixed vertically to the back of the key. The jack carries in a pivoted tongue a plectrum. Depressing the key releases a cloth damper from the string, raises the jack and forces the plectrum past the string, plucking it. Numerous issued United States patents disclose and describe various ways in which to implement a keyboard instrument. Some of these U.S. patents include the following:

1. U.S. Pat. No. 3,675,527 to Reeder, Jr. issued Jul. 11, 1972, entitled Piano Construction;
2. U.S. Pat. No. 4,130,044 to Yamada et al. issued Dec. 19, 1978, entitled Keyboard Musical Instrument and Improved Piano;
3. U.S. Pat. No. 4,156,380 to Fulton issued May 29, 1979, entitled Musical Instruments;
4. U.S. Pat. No. 4,444,083 to Apel et al. issued Apr. 24, 1984, entitled Keyboard Instrument, Especially a Piano or Similar Instrument;
5. U.S. Pat. No. 4,493,237 to DeLong et al. issued Jan. 15, 1985, entitled Electronic Piano;
6. U.S. Pat. No. 5,123,321 to Caught issued Jun. 23, 1992, entitled Piano; and
7. U.S. Pat. No. 5,552,560 to Ura issued Sep. 3, 1996 entitled Electronic Keyboard Musical Instrument With Multifunctional Keyboard. Each of these seven above-listed issued U.S. patents are incorporated herein as though set forth herein in full.

For purposes of the claims herein, the term "key" is intended to broadly mean all types of keys including conventional piano keys, buttons and other actuation devices. The term "conventional piano key" means conventional piano keys generally of the shapes shown in FIG. 1. Key 1 is a "conventional C piano key." It is rectangular with a divot on the upper, right side in order to accommodate placement of the C♯/D♭ key 8. Key 2 is a "conventional D piano key." It is rectangular with a first divot on the upper left side to accommodate placement of the C♯/D♭ key 8 and a second divot on the upper right side to accommodate placement of the D♯/Eb key 9. Key 9 is a "conventional D♯/Eb piano key." It is rectangular, shorter than each conventional diatonic piano key, and narrower than the lower portion of each such diatonic key.

FIG. 3 shows a guitar as an example of a stringed musical instrument having an elongated fingerboard. The guitar 100 comprises an elongated fingerboard 101 terminating at its upper end in a headpiece 102 which includes a number of pegs for 115 for string tensioning. The pegs are adjusted by their respective tuning keys 103 for each of the strings 104.

Fingerboard 101 has a series of frets 106, each comprising a transverse and raised rib on the upper surface of the fingerboard. The guitar in FIG. 3 includes 22 frets numbered 150 to 171 with fret number 150 located near the nut 109 at the upper end of the fingerboard at the point where the fingerboard 101 joins with the headpiece 102. Fret number 171 is located as the last fret at the lower end of the fingerboard where the fingerboard joins the tailpiece or soundboard 110 of the guitar 100.

The strings 104 extend from their respective pegs 115, over nut 109 (appropriately grooved to maintain string spacing), in parallel along the fingerboard over the spaced frets 106, to and over bridge 107 (located at the lower end of the tailpiece 110 ) and finally to their respective anchor points 111 on and within anchor member 112 on the tailpiece 110.

As previously noted, the strings 104, six in number, extend over substantially the entire length of the guitar from their respective anchor points 111 on and within the anchor member 112 to their respective pegs 115 and, as is conventional, the strings 104 extend slightly above the frets 106 formed on the upper surface of the fingerboard 101. For a six string guitar of the type illustrated in FIG. 1 the strings are typically tuned in the sequence $E_l$, A, D, G. B and $E_h$, from low E ($E_l$) to high E ($E_h$). In accordance with the pitch notation scheme reflected by FIG. 2, these six notes are e, a, d', g', b', and e".

A bass guitar has four strings rather than six strings. The strings on the bass guitar are set at E, A, d and g. Otherwise, the construction of a bass guitar is the same as is shown in FIG. 3.

Note variations for each string are achieved by depressing (stopped) a string at a selected fret. The note is produced by vibrating the string between the stopping fret and the bridge. Depression of each string to a stopping fret is accomplished by finger pressure applied to the string behind the fret (far side of the fret with respect to the bridge).

Not all string instruments have fretted fingerboards. For example, members of the viol family generally do not have fretted fingerboards, but in their basic construction they resemble guitars. Instruments within the viol family include, for example, the cello and the violin. Note variations are obtained with these instruments by pressing a string down to the fingerboard and then plucking or playing the string with a bow.

Numerous issued United States patents disclose and describe various ways in which to implement a string instrument. Some of these U.S. patents include the following:

1. U.S. Pat. No. 4,031,801 to Cecchini issued Jun. 28, 1997, entitled Stringed Musical Instrument;
2. U.S. Pat. No. 4,038,897 to Murray et al. issued Aug. 2, 1997, entitled Electronic Music System and Stringed Instrument Input Device Therefor;
3. U.S. Pat. No. 4,056,034 to Kaman issued Nov. 1, 1977, entitled Guitar Construction;
4. U.S. Pat. No. 4,069,732 to Moskowitz et al. issued Jan. 24, 1978, entitled Electric Guitar;
5. U.S. Pat. No. 4,372,187 to Berg issued Feb. 8, 1983, entitled Novel Guitar-Like Electronic Musical Instrument;
6. U.S. Pat. No. 4,377,101 to Santucci issued Mar. 22, 1983, entitled Combination Guitar and Bass;
7. U.S. Pat. No. 4,483,233 to Benson issued Nov. 20, 1984, entitled Combined Guitar and Bass Guitar Having Eight Strings;
8. U.S. Pat. No. 4,539,887 to Bjerkas issued Sep. 10, 1985, entitled String Instrument of Guitar Type;
9. U.S. Pat. No. 4,602,547 to Nyack, Jr. et al. issued Jul. 29, 1986, entitled Electric Guitar;
10. U.S. Pat. No. 4,658,690 to Aitken et al. issued Apr. 21, 1987, entitled Electronic Musical Instrument;
11. U.S. Pat. No. 4,704,935 to Franklin issued Nov. 10, 1987, Stringed Musical Instrument;
12. U.S. Pat. No. 4,722,260 to Pigozzi issued Feb. 2, 1988, entitled Stringed Musical Instrument Having Retracting Frets;
13. U.S. Pat. No. 4,748,887 to Marshall issued Jun. 7, 1988, entitled Electric Musical String Instruments and Frets Therefor;
14. U.S. Pat. No. 4,858,509 to Marshall issued Aug. 22, 1989, entitled Electric Musical String Instruments;
15. U.S. Pat. No. 4,887,506 to Freed issued Dec. 19, 1989, entitled Stringed Musical Instrument With Magnetic Pickups;
16. U.S. Pat. No. 5,095,795 to Wilfer issued Mar. 17, 1992, entitled String Instrument, Particularly Bass Guitar Or Electronic Guitar;
17. U.S. Pat. No. 5,113,737 to Gregory issued May 19, 1992, entitled Seven String Electric Guitar;
18. U.S. Pat. No. 5,121,668 to Segan et al. issued Jun. 16, 1992, Electronic Guitar;
19. U.S. Pat. No. 5,125,312 to Fishman et al. issued Jun. 30, 1992, entitled Stringed Musical Instrument;
20. U.S. Pat. No. 5,189,235 to Fishman et al. issued Feb. 23, 1993, entitled Stringed Musical Instrument; and
21. U.S. Pat. No. 5,497,688 to Ruiz-Carrero issued Mar. 12, 1996, entitled Musical Instrument. Each of these 21 issued patents are incorporated herein as though set forth herein in full.

One element in common with respect to all of the instruments discussed above is that each note playing means (such as keys and strings) have an associated playing surface visible to the musician playing the particular instrument. The top of a piano key, for example, is an associated playing surface with is visible to the piano player. Likewise, the fingerboard directly below a string of a guitar where the string is to be depressed in order to play a certain note is a playing surface visible to the guitar player.

One problem with the string and keyboard instruments discussed above is that they are difficult to learn, especially for children. One must learn musical notation, the location of each note on the particular instrument to be played, a variety of musical scales and chords, and the theory that ties all of these together. For example, the musician typically needs to know most or all of the major, minor and blues scales, as well as many different chords. Memorizing or quickly identifying such scales and chords can be a difficult task, particularly for the beginner. Often, the beginning or even intermediate musician will need to open a reference book and then find the appropriate page in order to identify all of the notes that make up a particular scale or chord. Alternatively, if the musician has sufficient knowledge of music theory, she might try to figure out all the notes in a given scale or chord. However, all of these approaches tend to be time-consuming and cumbersome. At the same time, merely looking in a book to find the notes that make up a scale or chord often does not provide the beginning musician with an intuitive sense as to how the various chords and/or scales relate to each other. As a result, the conventional reference techniques frequently do little to advance an understanding of music theory.

SUMMARY OF INVENTION

The present invention addresses the foregoing deficiencies by providing an apparatus for identifying combinations of notes, the apparatus including a template and a base portion.

More specifically, the invention is directed to identifying desired combinations of musical notes. The apparatus includes a base imprinted with plural different indicia, each different indicium corresponding to a different musical note. For example, the indicia might include musical symbols (e.g., C or G♯/A♭) and/or might include a different color or combination of colors for each note. A template having plural windows may be disposed over the base so as to selectively view plural of the different indicia. It is a feature of the invention that the template corresponds to a particular characteristic, such as the major scales or the minor ninth chords, and different positions of the template relative to the base reveal different sets of musical notes having said characteristic. For example, one position of the template might reveal the C major scale and another might reveal the A♯/B♭ major scale.

By virtue of the foregoing arrangement, a user often can quickly and easily identify, for example, a desired chord or scale by simply moving the template relative to the base. At the same time, use of the apparatus often can more rapidly facilitate an understanding of how various chords and scales relate to each other. As a result, the present invention often can make learning to play a musical instrument and learning the corresponding musical theory quicker and more enjoyable. When the indicia representing the musical notes are color-coded to match a musical instrument, the learning process typically will be even further improved.

In a more particularized aspect of the invention, spatial movements on the base correspond to step changes in the corresponding musical notes in a consistent manner. For example, each shift on the base to a next indicium in the rightward direction might result in the same first number of step changes (e.g., one half step) in the corresponding musical notes, and each shift on the base to the next indicium in the upward direction might result in the same second number of step changes (e.g., one half step) in the corresponding musical notes. By virtue of these aspects of the invention, shifting a template corresponding to a combination of musical notes will result in another combination of notes having the same characteristic but in a different musical key. As a result, a single template can be used to identify, for example, all the major scales or all the minor chords.

In still further particularized aspects of the invention, the template includes multiple sets of windows, with each of the sets corresponding to a different characteristic. Utilizing this feature of the invention, a single template can be used to identify a wide variety of different chords, scales and other combinations of musical notes. For example, a single template might be used to identify all the major, minor and blues scales, as well as all the major, minor, minor sixth, major seventh, major ninth and other chords.

In a still further particularized aspect of the invention, the indicia are arranged on the base such that the corresponding musical notes are arranged cyclically in order of increasing pitch. This feature generally permits a template to be shifted to a greater number of positions on the base to achieve a correspondingly greater number of combinations of notes having the specified characteristic. Such a feature can be implemented, for example, by repeating sequences of notes (e.g., beginning with an initial note, displaying the other eleven notes in the octave in order of increasing pitch, and then repeating the initial note and one or more of the other notes in order of increasing pitch) or by displaying an integer number of octaves of musical notes (in order of increasing pitch) in a ring-shaped arrangement (e.g., in a circular or cylindrical arrangement).

In a still further particularized aspect of the invention, the template is attached to the base so as to permit the template either to move linearly relative to the base (e.g., in a slide-rule fashion) or to rotate relative to the base (e.g., circular base and circular template attached at their centers or concentric cylinders). This aspect of the invention often can provide better alignment between the base and the template, while simultaneously reducing the possibility that one of the two might be misplaced.

The foregoing summary is intended merely to provide a brief description of the general nature of the invention. A more complete understanding of the invention can be obtained by referring to the claims and the following detailed description of the preferred embodiments in connection with the accompanying figures.

BRIEF DESCRIPTION OF THE DRAWINGS

FIG. 4 shows a chromatic key in accordance with the present invention.

FIG. 5 shows five keys from a conventional keyboard instrument.

FIG. 6A shows such a color sheet for the C key.

FIG. 6B shows such a color sheet for the D key.

FIG. 6C shows such a color sheet for the G♯/A♭ key.

FIG. 8 shows a sheet divided into a plurality of square sections.

FIG. 12 illustrates a base portion according to the present invention consisting of a single row.

FIG. 13 illustrates a base portion according to the present invention in which each row is identical to the other rows.

DETAILED DESCRIPTION OF THE PREFERRED EMBODIMENTS

The present invention includes several different aspects which can be utilized separately or in any desired combination. These different aspects can be generally categorized as follows.

Musical Training Using Colors

The basic concept of this aspect of the present invention is the use of color to facilitate the learning of musical instruments. According to the present invention, each diatonic note is assigned a different note color. In the preferred embodiment, the scheme is as shown in Table 2 below.

TABLE 2

| NOTE | COLOR |
| --- | --- |
| A | RED |
| B | ORANGE |
| C | YELLOW |
| D | GREEN |
| E | BLUE |
| F | INDIGO |
| G | VIOLET |

As may been observed, the above color scheme is based on the colors of the rainbow. However, a scheme with different note colors assigned to the various diatonic tones can be implemented.

Chromatic notes are then each assigned two colors, specifically the two colors assigned to the two diatonic tones one half step higher and one half step lower than the particular chromatic tone. For example, the note A♯/B♭ is assigned red and orange because red is assigned to A and orange is assigned to B. Of course, if other colors are assigned to A and B, those colors will be assigned to A♯/B♭. Table 3 below shows the preferred color scheme for the chromatic notes.

TABLE 3

| NOTE | COLORS |
| --- | --- |
| A♯/B♭ | RED and ORANGE |
| C♯/D♭ | YELLOW and GREEN |

TABLE 3-continued

| NOTE | COLORS |
| --- | --- |
| D♯/E♭ | GREEN and BLUE |
| F♯/G♭ | INDIGO and VIOLET |
| G♯/A♭ | VIOLET and RED |

According to the present invention, the assigned colors are then used on musical instruments to facilitate learning. Therefore, for example, for a keyboard instrument, the surface of a particular diatonic key comprises the note color assigned to the note played by said key. For example, the surface of the C key comprises yellow and the surface of the F key comprises indigo. Further, the surface of each chromatic key comprises the two assigned colors of the specific note played by the key. With respect to FIG. 1, Table 4 below identifies the preferred surface colors with respect to the surfaces of the keys.

TABLE 4

| KEY | NOTE | COLOR(S) |
| --- | --- | --- |
| 1 | C | YELLOW |
| 8 | C♯/D♭ | YELLOW and GREEN |
| 2 | D | GREEN |
| 9 | D♯/E♭ | GREEN and BLUE |
| 3 | E | BLUE |
| 4 | F | INDIGO |
| 10 | F♯/G♭ | INDIGO and VIOLET |
| 5 | G | VIOLET |
| 11 | G♯/A♭ | VIOLET and RED |
| 6 | A | RED |
| 12 | A♯/B♭ | RED and ORANGE |
| 7 | B | ORANGE |

Figure 1:
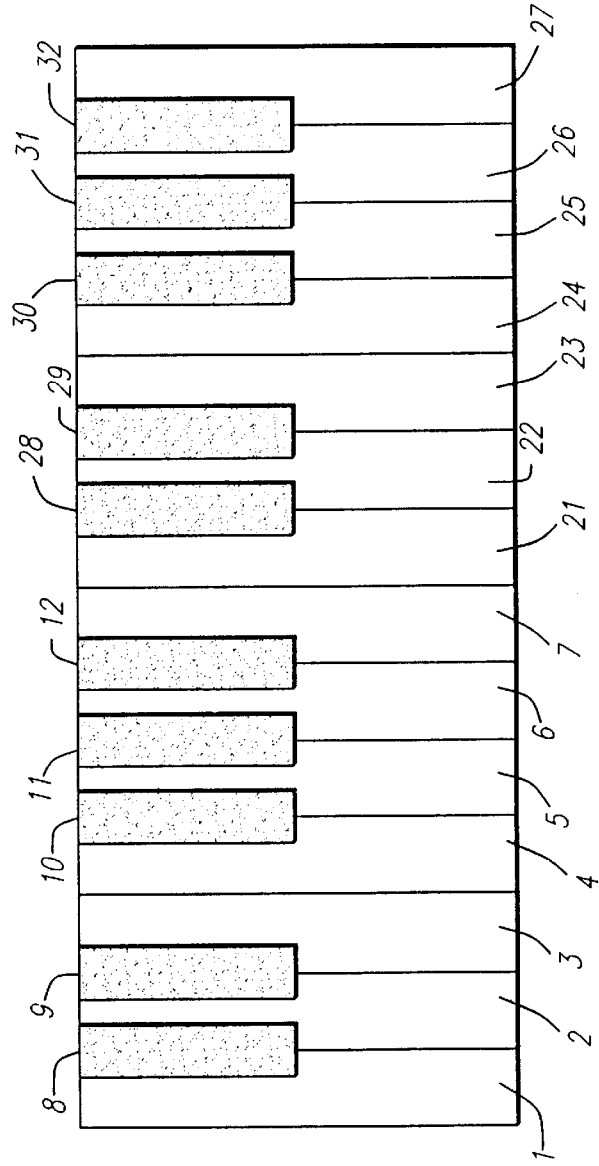
FIG. 1 shows a portion of a conventional piano keyboard.

Keys 21 through 32 of FIG. 1, in the preferred embodiment would also be colored appropriately. For example, the C key 21 would be colored yellow just like C key 1, and so on.

It would be possible not to color every key in a keyboard and still be within the scope of the present invention. However, in the preferred embodiment, all the keys would be colored. In instances where not all of the keys are colored, it would generally be expected—although not necessary—that at least eight consecutive diatonic keys would be colored (e.g., consecutive C, D, E, F, G, A, B and C keys).

With respect to each chromatic key, any pattern utilizing the two assigned note colors can be used. FIG. 4, however, reflects the preferred embodiment. Shown on FIG. 4 is the top surface of a chromatic piano key 180 comprising two note colors. The chromatic key is divided into a left portion 181 and a right portion 182 by an imaginary dashed line 183. In the preferred embodiment, the left portion comprises the color assigned to the diatonic note one half step lower than the chromatic note and the right portion comprises the color assigned to the diatonic note one half step higher than the chromatic note. For example, if the chromatic key 180 is a G♯/A♭ key, then the left portion 181 will comprise violet (the color of the G key, which is to the left of the chromatic key 180) and the right portion 182 will comprise red (the color of the A key, which is to the right of the chromatic key 180).

It should also be noted that it is possible not to utilize colors with respect to the chromatic keys, but leave them black or some other color not utilized with respect to the diatonic keys.

Also, it is not necessary to cover the entire surface of a key with its assigned color or colors. For example, one or more color dots can be used. FIG. 5 shows this dot configuration. In FIG. 5, the C key 190, C♯/D♭ key 191, D key 192, D♯/Eb key 193, and E key 194 are shown. Each key has a corresponding color dot 195 to 199. Color dot 195 (on the C key) is colored yellow, color dot 196 (on the C♯/D♭ key) is colored yellow and green, color dot 197 (on the D key) is colored green, color dot 198 (on the D♯/Eb key) is colored green and blue and color dot 199 (on the E key) is colored blue. Dots of other colors or color combinations can be used for the other keys of the keyboard.

For purposes of this application, except were otherwise indicated, in configurations wherein the standard underlying key color still appears (the configuration shown in FIG. 5 is one such configuration) the underlying key color is termed the "base color." Therefore, with respect to a conventional piano, the base color for the diatonic keys is white and the base color for the chromatic keys is black. Generally, the diatonic keys would all have one base color (usually white) and the chromatic keys would also all have one base color (usually black).

For purposes of this application, except where otherwise indicated, the term the "note color" means the color used to designate a diatonic note. Therefore, with respect to Table 2, above, the color yellow would be the "C note color" and the color red would be the "A note color."

With respect to FIG. 5, the surface of the keys shown each comprises primarily its base color. In other words, the surface of the key is either mostly white or black in color. Accordingly, it is not necessary in order to come within the scope of the present invention to have the note color comprise a majority of the surface of a key. However, it is expected that the note color will comprise more surface area of a diatonic key than other colors (not including the base color).

However, it is expected that the note colors will not be used inconsistently within the same keyboard. For example, it would not be expected that one note color would be utilized for both a C key and an E key (or some other diatonic key other than C). Also, it would not be expected that two keys corresponding to the same note would have different note colors applied. For example, it would not be expected to have two C keys, each comprising a different note color.

Color can be supplied to the surface of each key of the keyboard in many different ways. For example, the color can be painted on. Or color stickers can be applied to the keys. Such stickers will generally be flat sheets with a top colored side and a bottom side having adhesive thereon. Appropriately colored paper can also be taped on the keys. The color dots of FIG. 5, therefore, can comprise paint, color stickers, color paper taped on to the keys, or any other means of applying color to the keys.

For purposes of the invention, it is not necessary that all keys of a keyboard be colored consistent with their respective notes. For example, on a conventional piano with black chromatic keys and white diatonic keys, one may color only the surface of the keys forming a scale. For example, one might color only the eight keys comprising a major scale (e.g., C, D, E, F, G, A, G, C (one octave higher than the first C key)). In such a case, the two central note keys would be colored the same note color.

In another configuration, the color comprising the surface of a particular key can cover entire surface of the key. Therefore, a color sheet (sticker or otherwise) which substantially conforms to the outline of the surface of the key can be applied. FIG. 6A shows such a color sheet 200 for the C key, FIG. 6B shows such a color sheet 201 for the D key, and FIG. 6C shows such a color sheet 202 for the G♯/A♭ key.

Any sheet configuration will work so long as the dimensions of the sheet are the same or less than the dimensions of the key surface.

Figure 7:
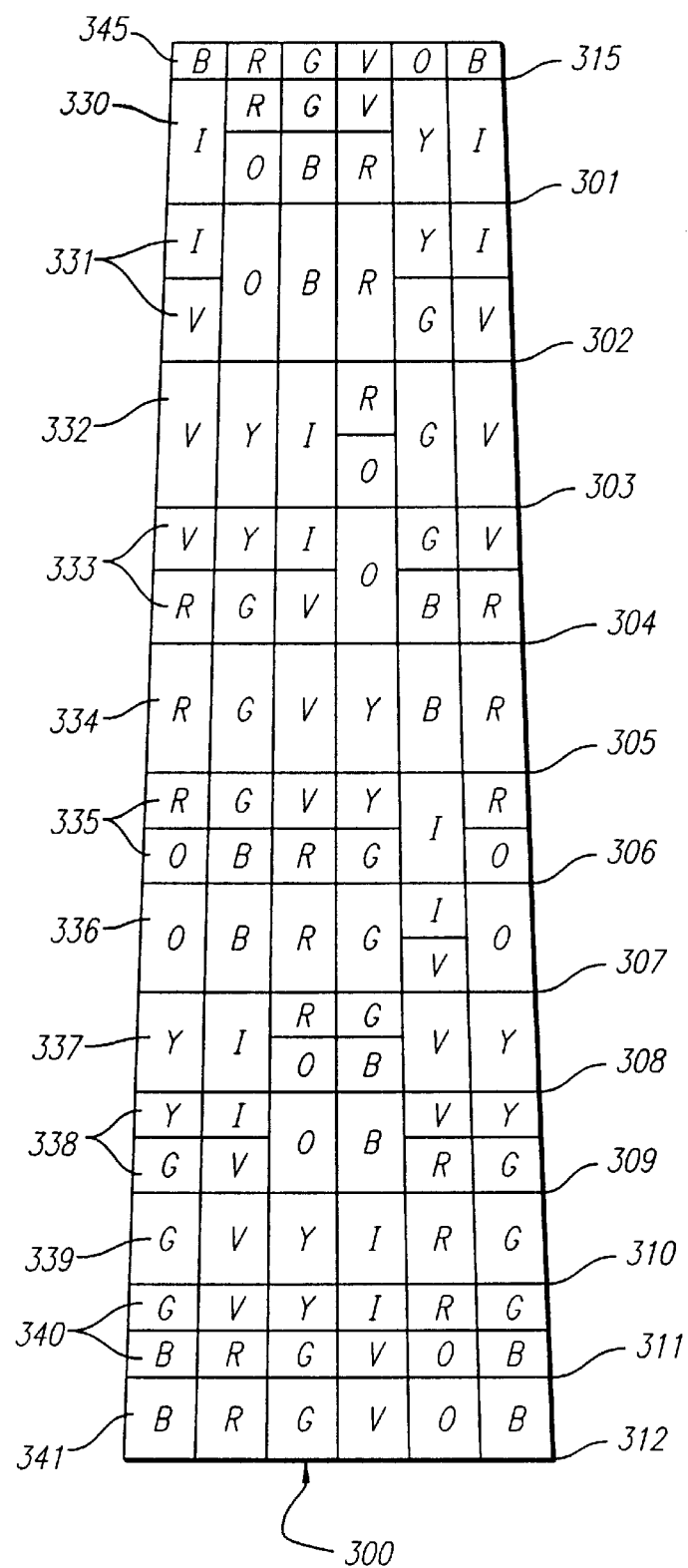
FIG. 7 shows a fretted fingerboard according to the present invention.

For purposes of this application, including the claims which follow, unless otherwise indicated, the term "surface" of a key is intended to include the color of the key, whether the color is supplied by paint, paper, plastic, or otherwise. The present invention also has application to string instruments. FIG. 7 shows a fretted fingerboard 300 according to the present invention. The fingerboard comprises 12 frets 301 to 312. Also shown in a nut 315. Each section formed between two neighboring frets comprises six note playing surfaces corresponding to the six strings of a treble guitar. Each note playing surface comprises the note color or colors associated with the particular note played at said note playing surface. The note colors are depicted in accordance with Table 6 below. The color or colors of the particular note playing surfaces of the low E string (330 to 341) are set in Table 5 below.

TABLE 5

| SECTION | COLOR(S) | NOTE | FRET |
|---|---|---|---|
| 330 | INDIGO | F | 1st |
| 331 | INDIGO and VIOLET | F♯/G♭ | 2nd |
| 332 | VIOLET | G | 3rd |
| 333 | VIOLET and RED | G♯/A♭ | 4th |
| 334 | RED | A | 5th |
| 335 | RED and ORANGE | A♯/B♭ | 6th |
| 336 | ORANGE | B | 7th |
| 337 | YELLOW | C | 8th |
| 338 | YELLOW and GREEN | C♯/D♭ | 9th |
| 339 | GREEN | D | 10th |
| 340 | GREEN and BLUE | D♯/E♭ | 11th |
| 341 | BLUE | E | 12th |

In the preferred embodiment, the area above the nut is also colored appropriately to show the note played by an open string (i.e., a string which is not depressed to play a higher note). One colored portion 345 of said area is colored blue for the note E. The others are red for A, green for D, violet for G, orange for B and blue for E.

It would be possible not to color every note playing surface on a fingerboard and still be within the scope of the present invention. However, in the preferred embodiment, all the note playing surfaces would be colored. In instances where not all of the note playing surfaces are colored, it would generally be expected—although not necessary—that at least eight consecutive diatonic keys would be colored (e.g., consecutive C, D, E, F, G, A, B and C keys).

It should also be noted that it is possible not to utilize colors with respect to the chromatic note playing surfaces, but leave them their base color. Also, it is not necessary to cover the entire surface of a note playing surface with its assigned color or colors. For example, as with respect to piano keys, one or more color dots can be used.

It is not necessary in order to come within the scope of the present invention to have the note color comprise a majority of a note playing surface. However, it is expected that the note color will comprise more surface area of a diatonic note playing surface than other colors (not including the base color).

It is expected that the note colors will not be used inconsistently within the same fingerboard. For example, it would not be expected that one note color would be utilized for both a C note playing surface and an E note playing surface (or some other diatonic note playing surface other than C). Also, it would not be expected that two note playing surfaces corresponding to the same note would have different note colors applied. For example, it would not be expected to have two C note playing surfaces each comprising a different note color.

Color can be supplied to the surface of each note playing surface of the fingerboard in many different ways. For example, the color can be painted on. Or color stickers can be applied to the note playing surfaces. Such stickers will generally be flat sheets with a top colored side and a bottom side having adhesive thereon. Appropriately colored paper can also be taped on the note playing surfaces.

Each color sticker would preferably cover its respective note playing surface entirely. Therefore, for example, there would be six equally-sized rectangular stickers to be placed side-by-side between two neighboring frets. Alternatively, one might use a single sticker showing color-coding for all six notes between two frets.

In addition, with respect to a fretted string instrument, the space between frets becomes narrower the closer to the bridge. Therefore, with respect to the fingerboard depicted in FIG. 7, the section between frets 301 and 302 would be wider than the section between frets 302 and 303, and so on. Therefore, the six rectangular stickers for the section between frets 301 and 302 would be longer than the stickers for the section between frets 302 and 303, which in turn would be longer than the stickers for the section between frets 303 and 304.

For purposes of this application, including the claims which follow, unless otherwise indicated, the term "surface" of a note playing surface is intended to include the color of the note playing surface, whether the color is supplied by paint, paper, plastic, or otherwise.

Identifying Combinations of Musical Notes

Figure 8:
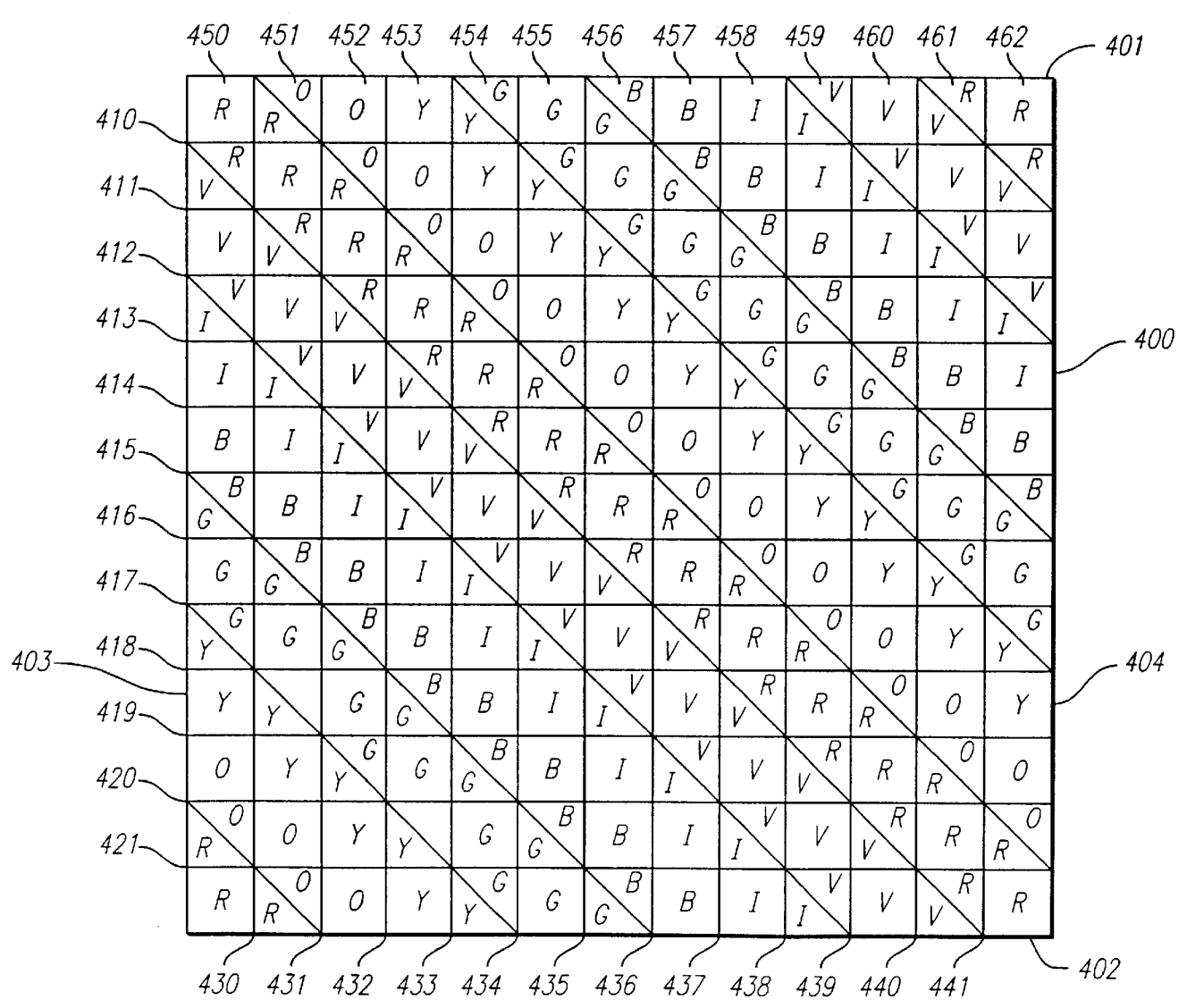

The color scheme described above also can be used to learn combinations of musical notes, such as chords and scales. FIG. 8 shows a sheet 400 divided into a plurality of square sections. The sheet is square having a top side 401, a bottom side 402, a left side 403, and a right side 404. The sheet is divided into the sections by 12 horizontal lines 410 to 421 and 12 vertical lines 430 to 441. Each section represents a note and either comprises one color or two. Table 6 below identifies each color used in FIG. 8 and the specific symbol used to identify such color.

TABLE 6

| SYMBOL | COLOR |
|---|---|
| R | RED |
| O | ORANGE |
| Y | YELLOW |
| G | GREEN |
| B | BLUE |
| I | INDIGO |
| V | VIOLET |

Sections 450 to 462 exemplify the sections. Sections 450, 452, 453, 455, 457, 458, 460, and 462 represent diatonic notes and each comprises the color representing its corresponding note. Sections 451, 454, 456, 459, and 461 represent chromatic tones and each comprises the two colors which combine to represent the section's corresponding note. Table 7 sets forth for each of the sections 450 to 462, the color or colors comprising the section and the note represented by the section. Because each color or color combination corresponds to a single note, the same color/note correspondence indicated in Table 7 exists throughout sheet 400.

TABLE 7

| NUMBER | COLOR(S) | NOTE |
| --- | --- | --- |
| 450 | RED | A |
| 451 | RED and ORANGE | A♯/B♭ |
| 452 | ORANGE | B |
| 453 | YELLOW | C |
| 454 | YELLOW and GREEN | C♯/D♭ |
| 455 | GREEN | D |
| 456 | GREEN and BLUE | D♯/E♭ |
| 457 | BLUE | E |
| 458 | INDIGO | F |
| 459 | INDIGO and VIOLET | F♯/G♭ |
| 460 | VIOLET | G |
| 461 | VIOLET and RED | G♯/A♭ |
| 462 | RED | A |

It should be observed that additional written matter besides color can also be set forth in each of the various sections of FIG. 8. For example, the letter symbols of the notes can also be written in the sections (e.g., "A" in section 450, "B" in section 452, and C♯/D♭ in section 454).

Figure 9A:
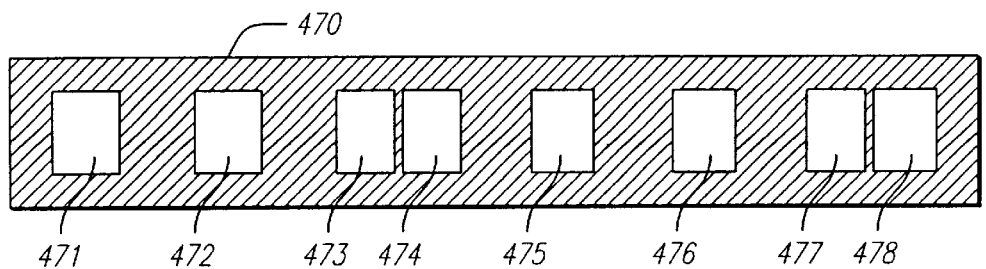
FIG. 9A shows a template corresponding to the major scale.

FIG. 9A shows a template 470 corresponding to the major scale. The template comprises a rigid sheet having a series of square holes (or windows) 471 to 478 formed within the sheet. Each said square hole represents a note in the major scale and is substantially the size of the square sections of FIG. 8. Square holes 471 to 478 represent the central note, second note, third note, fourth note, fifth note, sixth note, seventh note and higher central note of the major scale respectively.

Template 470 can be placed over the sheet 400 depicted in FIG. 8 so as to determine the specific notes in a specific major scale. For example, said template can be placed on the sheet 400 of FIG. 8 such that hole 471 is over section 450, hole 472 is over section 452, hole 473 is over section 454, hole 474 is over section 455, hole 475 is over section 457, hole 476 is over section 459, hole 477 is over section 461 and hole 478 is over section 462. Such a placement indicates that to play the A major scale, one would play the A, B, C♯/D♭, D, E, F♯/Gb, G♯/A♭ and A notes. In a similar manner, the template could be used in any of the rows or columns formed by the sections of sheet 400. For example, by sliding template 470 down one row and again reading from left to right, template 470 would reveal the G♯/A♭ major scale. In fact, by changing the row that template 470 covers, one can identify any major scale that one desires, with the note revealed by window 471 indicating the particular major scale and the other windows, reading from left to right, revealing the other notes in the scale.

As noted above, template 470 also could be used in any column of sheet 400 by placing window 471 over any of the sections in the bottom row of sheet 400, orienting template 470 so that it covers an entire column of sheet 400 (i.e., such that template 470 is rotated 90° counter-clockwise to the orientation shown in FIG. 9A), and then reading the revealed notes from the bottom to the top of sheet 400. Also in this case, the note revealed by window 471 indicates the specific major scale.

Figure 9B:
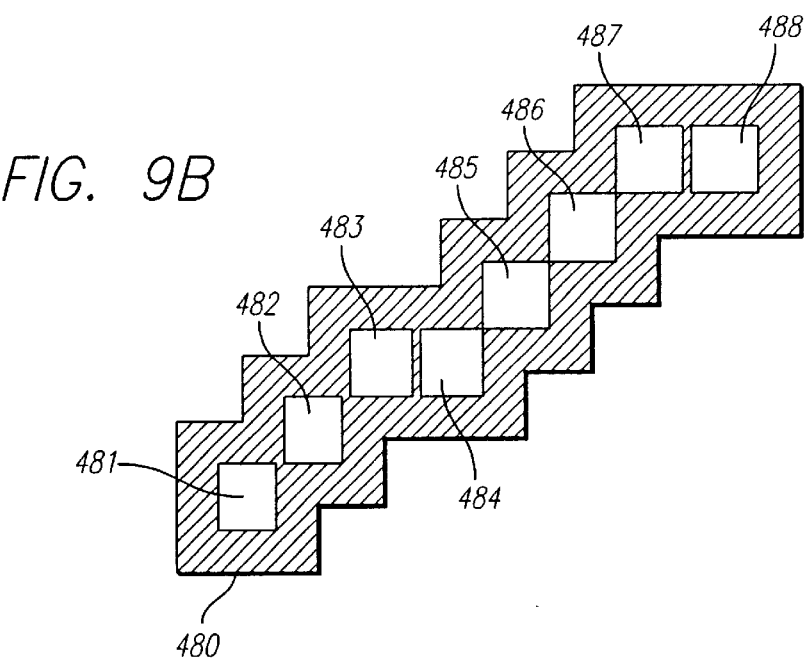
FIG. 9B shows another major scale template having holes therein.

Other template configurations can be used in conjunction with sheet 400. FIG. 9B shows another major scale template 480 having holes 481 to 488 therein, which correspond to the central, second, third, fourth, fifth, sixth, seventh and high central notes of the major scale respectively. This template also can be utilized in conjunction with sheet 400. Specifically, with template 480 oriented as shown in FIG. 9B and sheet 400 oriented as shown in FIG. 8, template 480 is placed over sheet 400. In this manner, the note revealed by window 481 indicates the specific major scale and the other windows 482 to 488 respectively reveal the other sequential notes of that scale (i.e., reading from the lower left corner of template 480 to the upper right corner). For example, by arranging template 480 so that window 481 reveals section 465, window 482 reveals section 466, and so on, the C major scale is revealed.

Figure 9C:
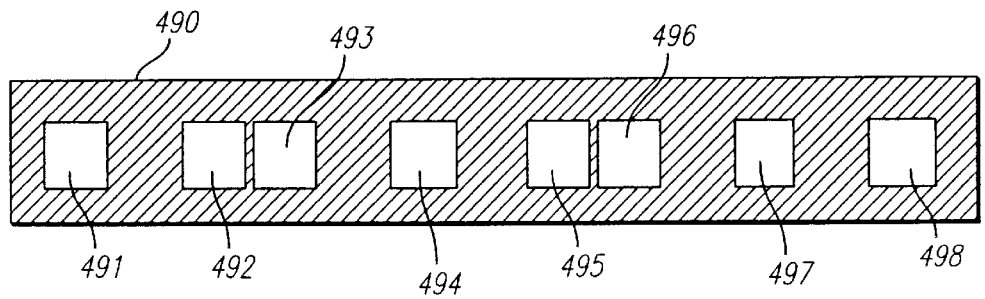
FIG. 9C shows a minor scale template having holes therein.

Similarly, FIG. 9C shows a minor scale template 490 having holes 491 to 498 therein, which correspond to the central, second, third, fourth, fifth, sixth, seventh, and high central notes of the minor scale respectively. Template 490 can be used with sheet 400 in the same ways described above for template 470, but instead will reveal the minor scales, with the particular minor scale being identified by window 491. Placed across the top row of sheet 400, said holes correspond to the following square sections and notes as shown in Table 8 below.

TABLE 8

| HOLE | SECTION | NOTE |
| --- | --- | --- |
| 491 | 450 | A |
| 492 | 452 | B |
| 493 | 453 | C |
| 494 | 455 | D |
| 495 | 457 | E |
| 496 | 458 | F |
| 497 | 460 | G |
| 498 | 461 | A |

Similar templates could be constructed for the blues scale and other scales, as described in more detail below.

Figure 10:
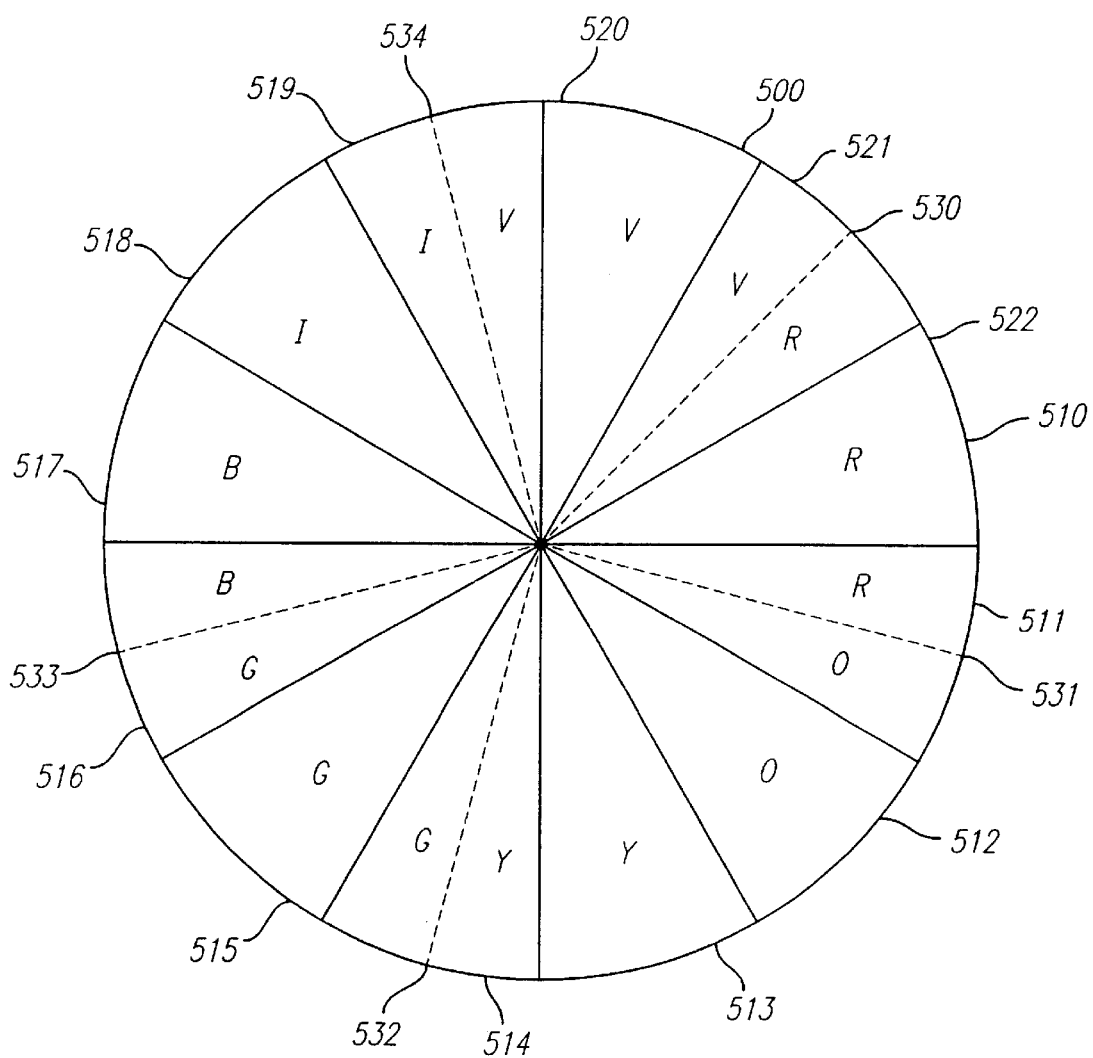
FIG. 10 shows a circular, rigid sheet with a center.

FIG. 10 shows a circular, rigid sheet 500 with a center 501. Said circular sheet comprises 12 equal pie-shaped sections 510 to 521. Each section represents a note and is colored appropriately. Imaginary dashed lines 530 to 534 divide sections 521, 511, 514, 516 and 519, respectively, showing that said sections comprise two colors. Table 9 below identifies each section, the color or colors of each section and the note corresponding to each section.

TABLE 9

| NUMBER | COLOR(S) | NOTE |
| --- | --- | --- |
| 510 | RED | A |
| 511 | RED and ORANGE | A♯/B♭ |
| 512 | ORANGE | B |
| 513 | YELLOW | C |
| 514 | YELLOW and GREEN | C♯/D♭ |
| 515 | GREEN | D |
| 516 | GREEN and BLUE | D♯/E♭ |
| 517 | BLUE | E |
| 518 | INDIGO | F |
| 519 | INDIGO and VIOLET | F♯/G♭ |
| 520 | VIOLET | G |
| 521 | VIOLET and RED | G♯/A♭ |
| 522 | RED | A |

A circular template can be placed over the top of the circular rigid sheet 500 and affixed to the center by a rivet or other means. The template would have holes formed therein to correspond to major, minor, blues and/or other scales and could be rotated appropriately around the center securing means.

Figure 11A:
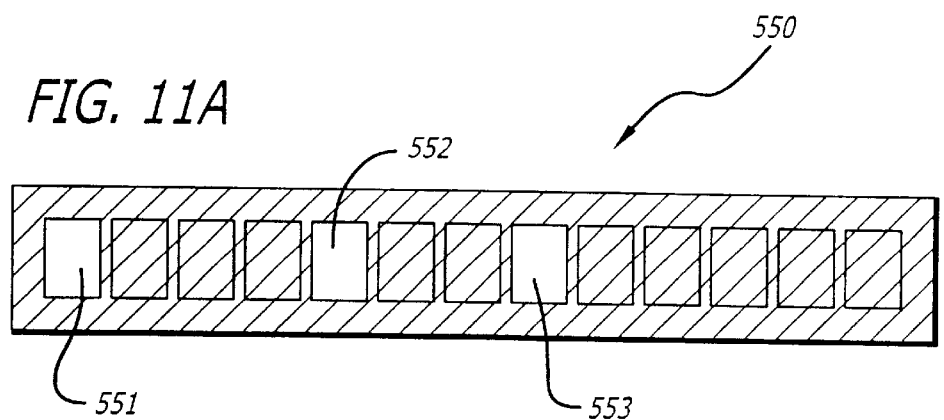
FIGS. 11A and 11B illustrate templates for identifying the major chords.

The template apparatuses described above permit a musician to quickly identify the combinations of notes that make up a musical scale. Similar apparatuses can be utilized to identify other combinations of notes, such as chords. For example, FIG. 11A illustrates a template 550 for identifying the notes of the major chords. As can be seen from FIG. 11A, template 550 includes three windows 551 to 553. By positioning template 550 (in the orientation shown in FIG. 11A) over sheet 400 (in the orientation shown in FIG. 8), the notes of any major chord can be identified. Specifically, the note revealed by window 551 would indicate which major chord is being revealed and the notes revealed by windows 552 and 553 would indicate the other notes in the chord. For example, positioning template 550 so that window 551 is over section 450 would reveal the A major chord. In this case, the revealed notes, A (section 450), C♯/D♭ (section 454) and E (section 457), are all the notes of the A major chord. Similarly, positioning template 550 so that window 551 is over section 453 would reveal the C major chord. In this case, the revealed notes, C (section 453), E (section 457) and G (section 460), are all the notes of the C major chord.

It can be readily observed that template 550 is identical to template 470 with windows 472, 474 and 476 to 478 omitted (e.g., blacked out). Correspondingly, template 550 also can be used in any of the rows or columns of sheet 400, in a similar manner as template 470. However, because the windows in template 550 span less than the width of sheet 400, it is not necessary that window 551 be placed over one of the sections in the first column of sheet 400 (for the row implementation) or one of the sections in the last row of column 400 (for the column implementation). Rather, provided that template 550 is oriented as shown in FIG. 11A or 90° counter-clockwise to the orientation shown in FIG. 11A (with sheet 400 oriented as shown in FIG. 8), and provided further that all of the windows of template 550 lie within sheet 400, then template 550 will reveal the notes of the major chord identified by the section revealed by window 551.

Figure 11B:
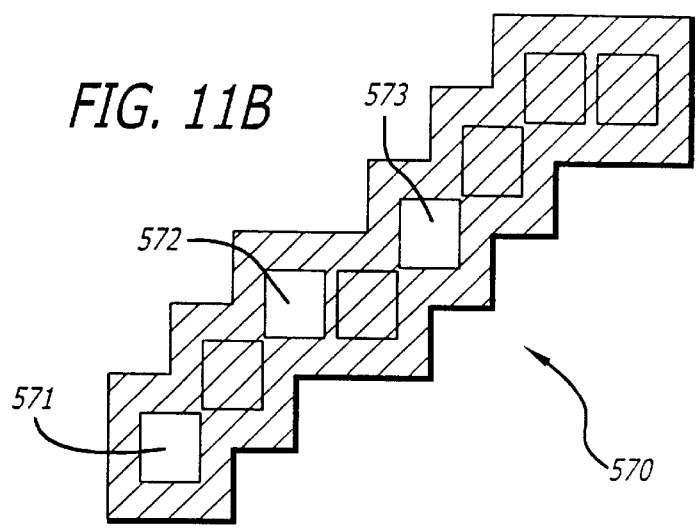

Chord templates similar to the scale templates illustrated in FIGS. 9B and 9C also can be constructed. Thus, FIG. 11B illustrates a template 570 that is analogous to template 480 shown in FIG. 9B. Template 570 includes only three windows 571 to 573 that correspond to windows 481, 483 and 485, respectively, in template 480. Similarly, template 570 can be used in the same manner as template 480, but when so used will reveal the major chords rather than the major scales. That is, provided that template 570 is oriented as shown in FIG. 11B (with sheet 400 oriented as shown in FIG. 8), and provided further that all of the windows of template 570 lie within sheet 400, then template 570 will reveal the notes of the major chord identified by the section revealed by window 571.

Figure 11C:
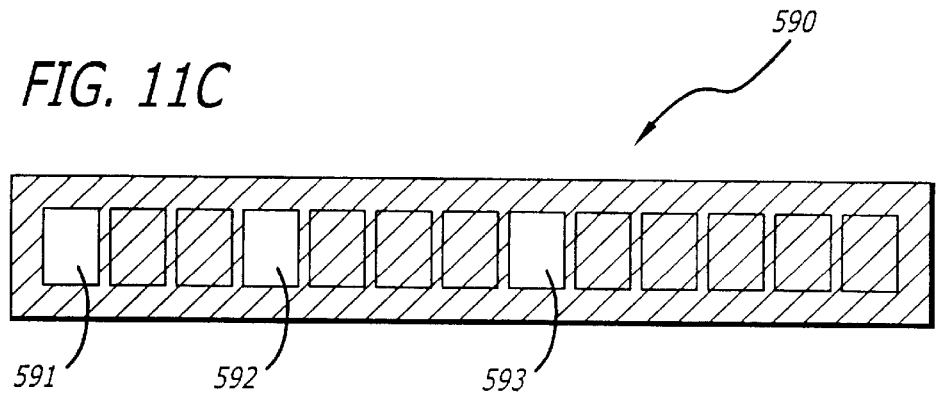
FIG. 11C illustrates a template for identifying the minor chords.

Also, template 590 in FIG. 11C can be utilized in a similar manner to template 490 in FIG. 9C to identify the notes in the minor chords. Template 590 includes only three windows 591 to 593 that correspond to windows 491, 493 and 495, respectively, in template 490. Thus, provided that template 590 is oriented as shown in FIG. 11C or 90° counter-clockwise to the orientation shown in FIG. 11C (with sheet 400 oriented as shown in FIG. 8), and provided further that all of the windows of template 590 lie within sheet 400, then template 590 will reveal the notes of the minor chord identified by the section revealed by window 591.

Additional templates can be constructed to provide the chords or scales described above. Typically, many more templates for the same chord can be constructed than for the same scale, because the notes in a scale are arranged in a particular order, whereas generally any combination of the appropriate notes can be used to form a chord. The specific technique for forming a template will vary in accordance with the arrangement of the sections on the base.

For example, where the base is sheet 400, a movement of one section to the right or one section up from the current section results in a note that is one half step higher than the note corresponding to the current section. Thus, a template for a combination of notes can be constructed by starting with one of the notes in the combination (e.g., the central note or root note) and then moving up, down, left or right as needed to generate the other notes in the combination. For example, the scales in FIGS. 9A and 9C could be constructed in this manner by starting with a window corresponding to the central note and then using all rightward movements. Similarly, the scale in FIG. 9B could be constructed by starting with the central note and using a combination of rightward and upward movements.

Alternatively, one might simply identify the combination of notes in a single key and then create a template to reveal those notes. Assuming the base is imprinted so that spatial movements on the base translate into step changes in the corresponding notes in a consistent manner (as is sheet 400), the same template will function to identify the combination of notes having that characteristic in any other key as well. Thus, for example, knowing that the C major chord includes the notes C, E and G, one could select any three sections on sheet 400 that correspond to those notes. The pattern thus formed when shifted to a different area on sheet 400 will identify another major chord, with the specific chord being identified by the note revealed by the window which revealed the C note when the template was originally formed. Although the template can be formed by selecting any combination of notes having the desired characteristic, it is preferable that the selected notes be as physically close to each other as possible so as to minimize the sizes of the template and the base portion. Whatever arrangement is selected for the base, generally it will be preferable to have the sections laid out so that adjacent sections correspond to notes that are one half step apart. It is also preferable that the sections are arranged so that the corresponding musical notes are arranged cyclically on the base.

One example of such a cyclic pattern is illustrated in sheet 400, shown in FIG. 8. In the case of sheet 400, the notes are arranged horizontally and each section represents a note that is one half step higher than the note represented by the section immediately to its left and one half step lower than the note immediately to its right. This pattern is repeated for thirteen notes in each horizontal row. In addition, in sheet 400 each horizontal row is offset from the preceding horizontal row by one half step. As a result, all possible sequences of the twelve different notes (in this case with the initial note of each row repeated as the last note, to make a total of thirteen sections in each row) are displayed.

An alternative cyclic arrangement is achieved in sheet 500 (shown in FIG. 10) by arranging all twelve musical notes in a circle. A cyclic arrangement also can be achieved by simply repeating the notes periodically.

Figures 12, 13:
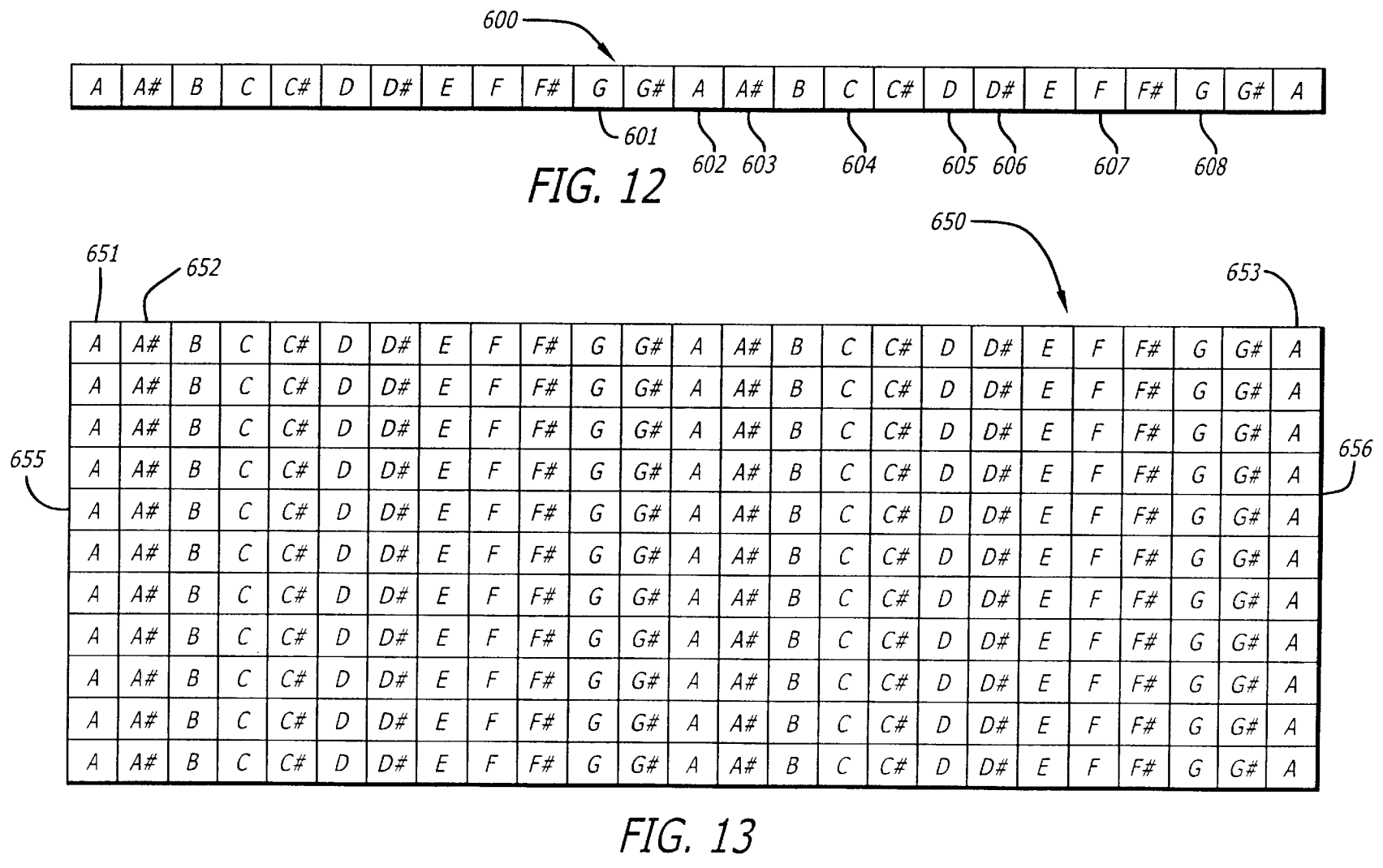

This latter arrangement is illustrated as base sheet 600 in FIG. 12. In FIG. 12, in order to shorten the length of the base sheet 600, the sections corresponding to the chromatic notes indicate only the sharp and not the flat notation. Thus, for example, the A♯/B♭ note is written as A♯ in order to conserve space. In the embodiment shown in FIG. 12, the cyclic arrangement of notes is achieved by periodic repetition. The result is very similar to the arrangement of sheet 400. This fact is clearly highlighted by the fact that many of the same templates (e.g., 470, 490, 550 and 590) can also be used directly on base sheet 600. In this case, because base sheet 600 essentially is one-dimensional, the different chords or scales are identified by sliding one of these templates horizontally relative to the base 600. Thus, for example, template 490 can be slid along base 600 to identify the minor scales, with the particular scale being identified by the note revealed by window 491. Accordingly, if window 491 is arranged over section 601, then windows 492 to 498 would reveal sections 602 to 608, respectively, showing that the G minor scale includes notes G, A, A♯/B♭, C, D, D♯/Eb, F, G.

It is possible with the arrangement illustrated in FIG. 12 to utilize a different template for each different type of chord, scale or other desired combination of musical notes. For example, one might utilize the same base 600, but have one template for the major scales, another for the minor scales, another for the blues scales, another for the major chords, another for the minor chords, another for the minor sixth chords, another for the major seventh chords, another for the major ninth chords, and so on. In this case, each time a different type of chord is desired, a different template must be located and used.

However, because the cyclic arrangement of notes has been accomplished in one dimension in sheet 600, it is also possible to include multiple types of chords on the same template by enlarging the base in the other dimension. One example of this embodiment of the invention is illustrated in FIG. 13. Here, base 650 is arranged identically to base 600, except that base 600 repeats the single row included in base 600 multiple times. As a result, multiple templates can be utilized at a single time.

Figure 14:
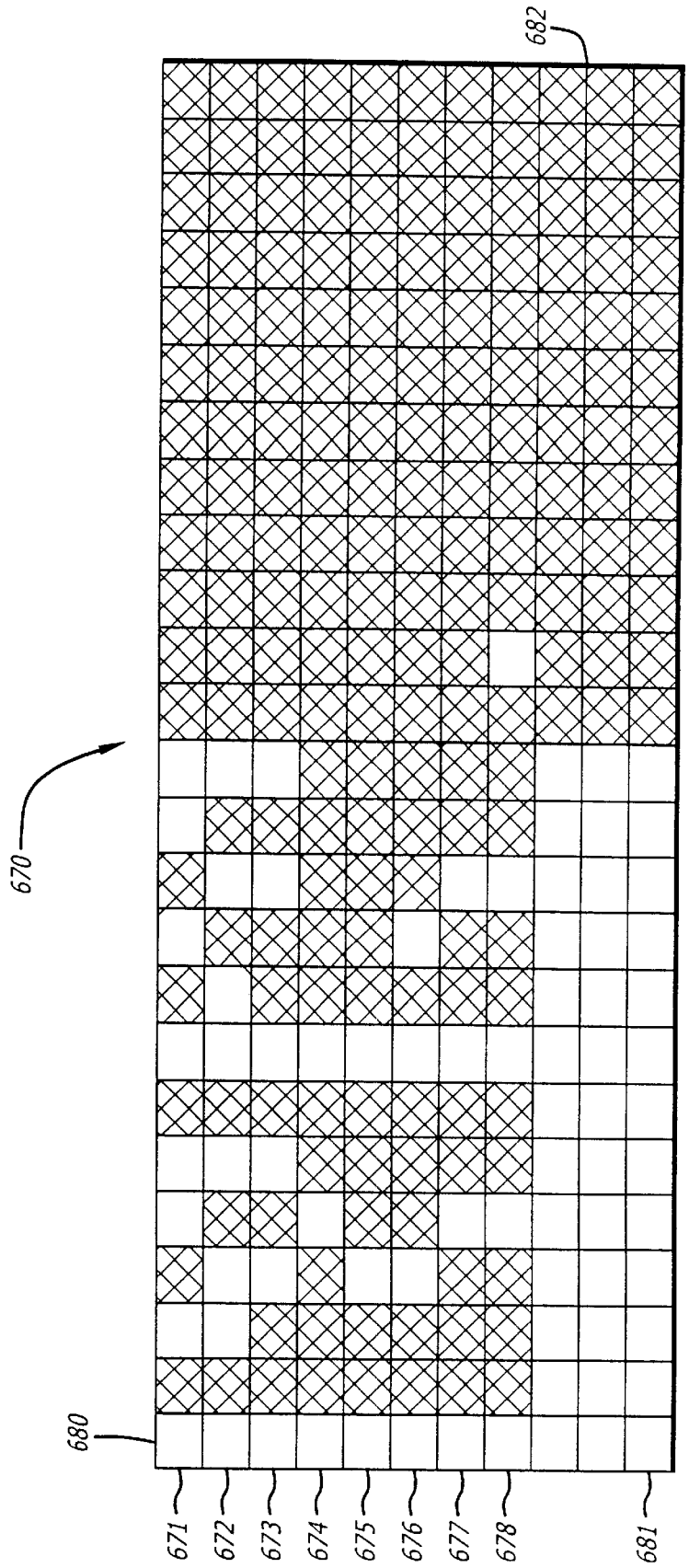
FIG. 14 illustrates a template for use in connection with the base portion shown in FIG. 13.

One example of such a template is template 670 shown in FIG. 14, in which the open sections indicate windows and the cross-hatched sections indicate opaque regions. Template 670 includes a row 671 for the major scales, row 672 for the minor scales, row 673 for the blues scales, row 674 for the major chords, row 675 for the minor chords, row 676 for the minor sixth chords, row 677 for the major seventh chords, row 678 for the major ninth chords, and may include as many other rows corresponding to other combinations of notes as desired, up to the number of rows that base 650 has. Thus, for example, when template 670 is arranged such that window 680 is aligned with section 652, row 671 reveals the D major scale, row 672 reveals the D minor scale, row 673 reveals the D blues scale, row 674 reveals the notes of the D major chord, row 675 reveals the notes of the D minor chord, row 676 reveals the notes of the D minor sixth chord, row 677 reveals the notes of the D seventh chord, row 678 reveals the notes of the D ninth chord, and so on.

In the above embodiment, the notes are indicated by using letters in conjunction with the sharp (♯) and flat (♭) symbols. However, if the base portion is instead color-coded, as described in some of the other embodiments above, then the base portion need only consist of a single elongated row. Thus, rather than repeating the symbol "A" multiple times in column 651 of base portion 650, the entire column 651 might instead simply be colored red. Similarly, the second column 652 might omit the symbol "A♯" and instead be colored half red and half orange. In addition to simplifying the imprinting of the base portion, this embodiment of the invention has the additional advantages that alignment between the base portion and the template is not as critical and that the entire apparatus can be used in connection with color-coded musical instruments described above.

Figures 15A, 15B:
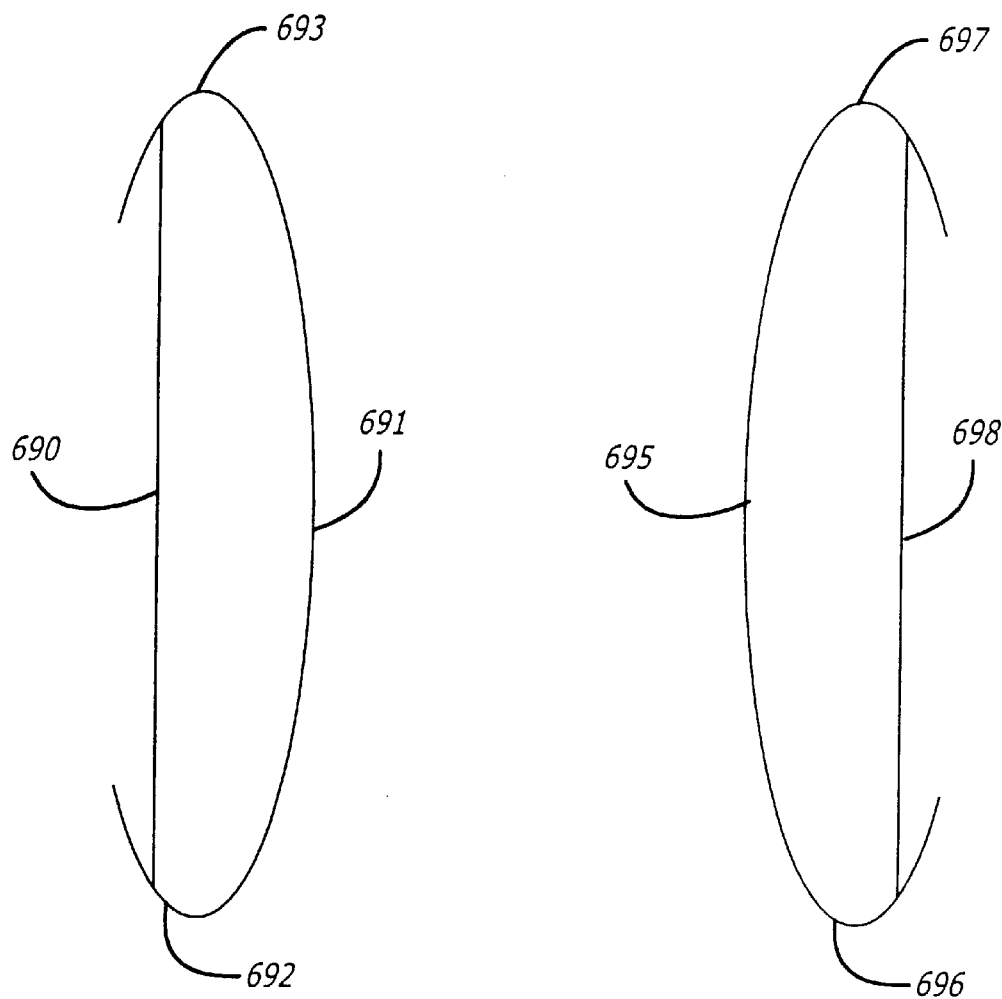
FIGS. 15A and 15B illustrate two methods for attaching the base portion to the template portion according to a representative embodiment of the invention.

The embodiments described above using base 600 and base 650 may be implemented with a separate template that one simply places over the corresponding base. Alternatively, the template may be attached to the base in such a manner as to facilitate the relative motion between base and template. For example, FIGS. 15A and 15B illustrate cross-sectional views of an apparatus that includes a base portion and a template portion according to two representative embodiments of the invention. As illustrated in FIG. 15A, the base portion 690 may be a flat panel with template 691 having a lower lip 692 that extends underneath base portion 690, an upper lip 693 that extends over base portion 690, or both. Alternatively, as illustrated in FIG. 15B, the base portion 695 may be provided with a lower lip 696 that extends underneath template 698, an upper lip 697 that extends over template 698, or both.

In either case, the template can move laterally in one dimension (e.g., into or out of the page in FIGS. 15A and 15B) relative to the base portion but is prevented from moving relative to the base portion in the other dimensions. This can facilitate alignment between the template and the base portion and, at the same time, reduce the possibility of losing one of the pieces. It is noted that the two pieces may be separated from each other by sliding the two far enough apart. Alternatively, either or both of the base portion and the template may be provided with a stop to prevent the other portion from sliding far enough to separate from it. Also, various other techniques may be employed to attach the template to the base portion while still permitting the two to slide relative to each other, such as using an elongated groove on one component and an elongated protrusion that fits into the groove on the other component, using various track mechanisms, and other conventional techniques.

The foregoing embodiments have focused primarily upon linear arrangements of the sections on the base portion. However, as indicated above in connection with the discussion of FIG. 10, the sections may be arranged on the base in a circular or ring fashion. One advantage of using a ring configuration is that fewer sections often need to be utilized on the base portion because the arrangement is naturally cyclic. Thus, in the embodiment shown in FIG. 10, only twelve notes need to be represented to permit identification of all scales, chords and other combinations of musical notes. Of course, it is also possible to include more notes. Preferably, any additional notes are added in increments of twelve so as to maintain the cyclic nature of the arrangement. Unfortunately, it may become difficult to discern the written indicia on the slices as the number of slices increases to 24, 36 or even more. Also, this ring arrangement may require the user to rotate the entire apparatus to read the sequence of notes. This may be particularly problematic where the notes are written out in letters (rather than represented by colors) or where scales are concerned (and therefore the order of the notes is more critical).

Figure 16A:
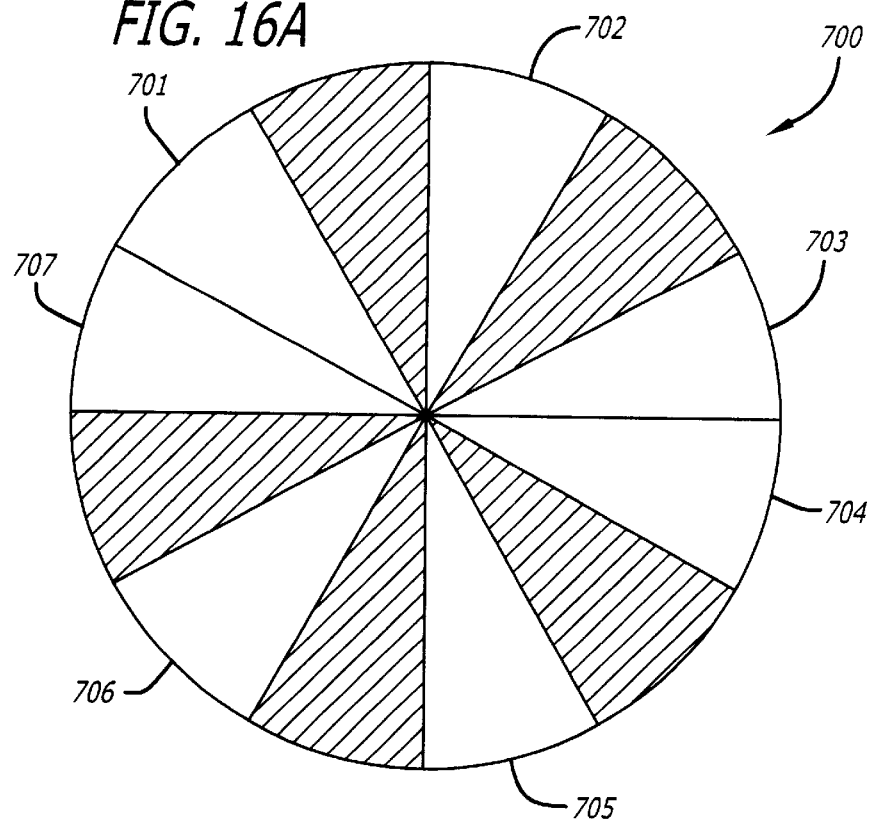
FIGS. 16A and 16B illustrate two circular templates according to a representative embodiment of the invention.

With respect to the base illustrated in FIG. 10, template 700 (shown in FIG. 16A) may be used to identify the major chords. Specifically, windows 701 to 707 correspond to windows 471 to 477, respectively, in FIG. 9A, and with window 701 also corresponding to window 478. In this case, the note revealed by window 701 indicates the major scale shown, and preferably is marked as such on template 700.

Figure 16B:
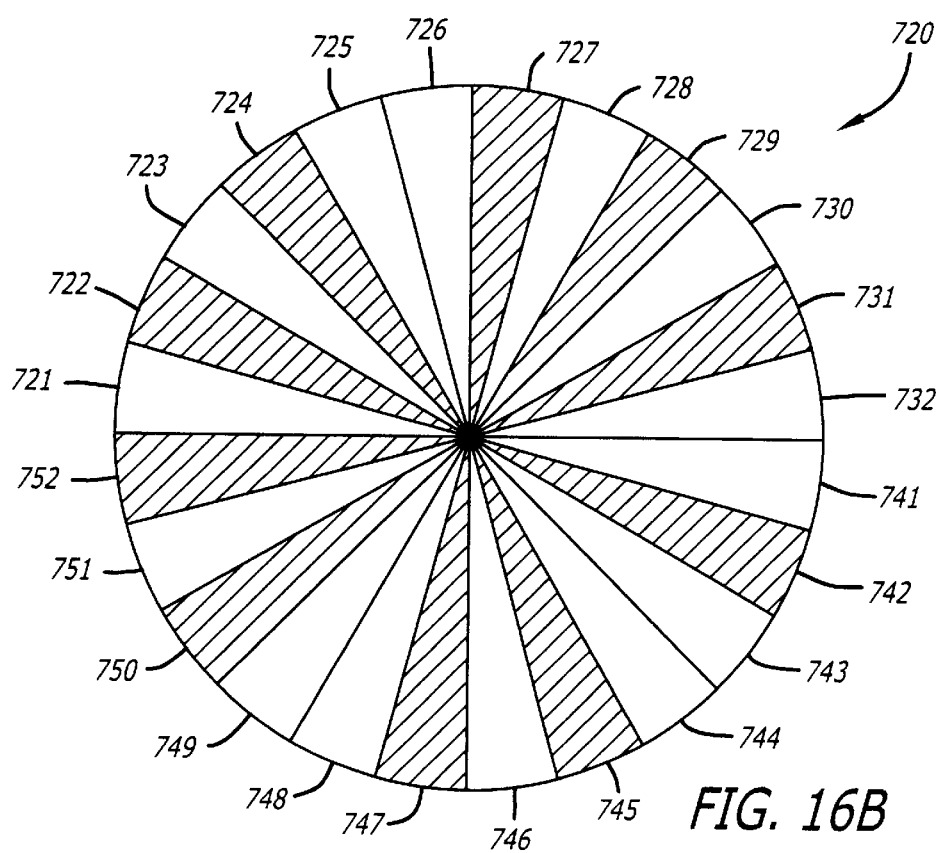

FIG. 16B illustrates a template 720 that may be used in connection with a ring-shaped base that has 24 sections. Template 720 has two portions, an upper portion consisting of sections 721 to 732 and a lower portion consisting of sections 741 to 752. The upper portion identifies the major scales with the particular major scale being the note revealed by section 721. The lower portion identifies the minor scales with the particular minor scale being the note revealed by section 741.

Figure 16C:
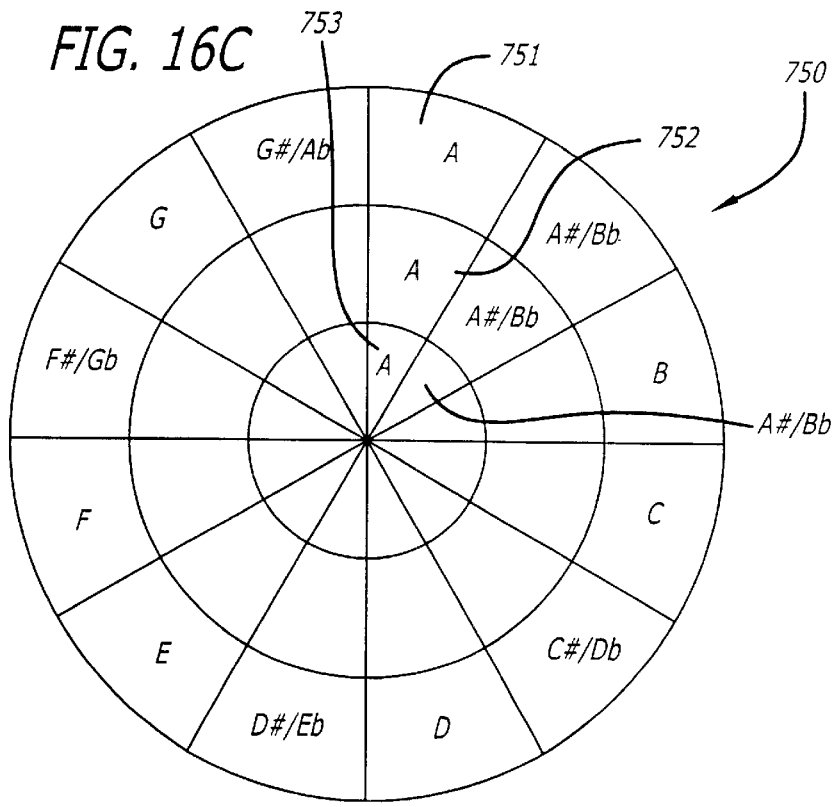
FIG. 16C illustrates a circular base portion having concentric rings.
Figure 16D:
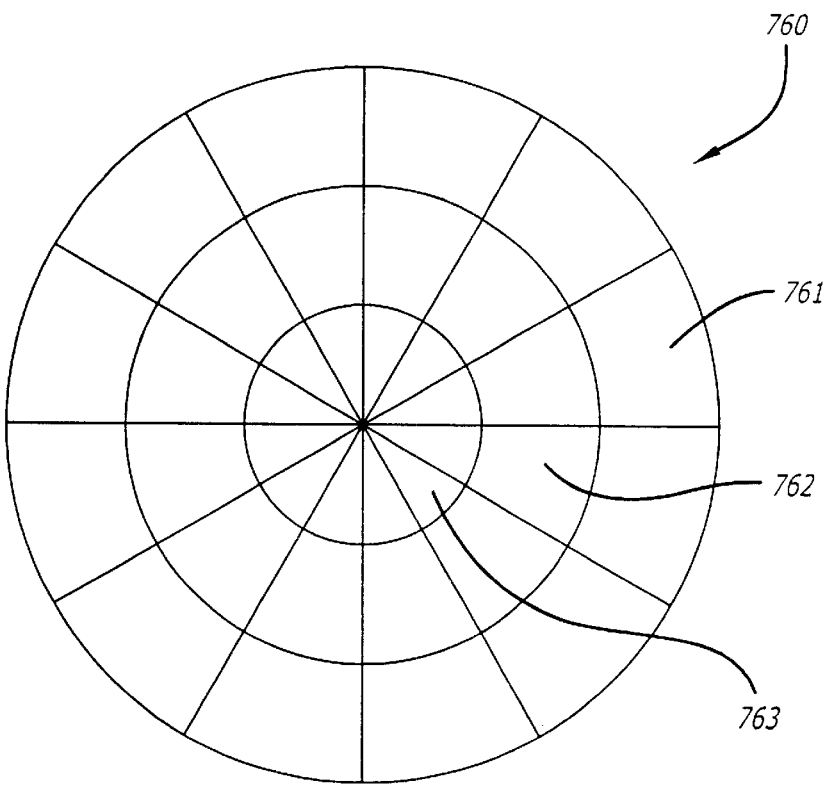
FIG. 16D illustrates a template for use in connection with the base portion shown in FIG. 16C.

An alternative embodiment utilizing a ring-shaped base is shown in FIGS. 16C and 16D. Specifically, FIG. 16C illustrates a ring-shaped base portion 750 that includes twelve sections corresponding to the twelve different musical notes. Each section is divided into three sub-sections, such as sub-sections 751 to 753, so as to form three concentric rings. Each ring thus has twelve sections corresponding to the twelve musical notes. Base portion 750 can be used with template 760 (shown in FIG. 16D) to identify three different combinations of notes, such as chords or scales. Specifically, template 760 also includes three concentric rings 761 to 763, each including twelve sections that may be a window or an opaque area. As a result, each of rings 761 to 763 can be designed to correspond to a different arrangement of notes. If the combination is order-dependent, it may be preferable to indicate the window corresponding to the starting note (e.g., central note) on each ring.

In the ring-based apparatuses described above, the template and base portion can be separate items with the template merely placed over the base portion or can be attached to each other so as to facilitate alignment and to minimize the risk of losing one of the pieces. If attached, the attachment means can be permanent, such as a rivet, or removable, such as a two-piece threaded hub extending through the centers of both the template and the base.

In addition to utilizing the disk configuration described above, a ring-shaped configuration can be implemented in other ways. For example, one technique for obtaining the benefits of the ring-shaped configuration is to use two concentric cylinders, with the inner cylinder being the base and the outer cylinder being the template portion. Such an implementation might be constructed, for example, by beginning with the base portion 650 shown in FIG. 13. First, column 653 is removed from base portion 650 (to insure that the arrangement will be cyclic) and then the remaining portion of base portion 650 is bent into a cylindrical shape such that left edge 655 connects with right edge 656, with the written indicia on the outside surface of the cylinder. Next, template 670 also is bent into a cylindrical shape in the following manner. Holding the cylindrical base portion just created, template 670 is wrapped around cylindrical base portion so that left edge 681 connects with right edge 682 and so that the outside surface of the cylindrically shaped template appears as shown in FIG. 14.

In this manner, the template cylinder can be rotated relative to the base cylinder in order to identify combinations of notes, such as scales and chords. Various techniques can be employed to construct such concentric cylinders. For example, sheet 670 might be bonded to a clear rigid cylinder and sheet 650 bonded to a rigid cylinder with a slightly smaller diameter. Thereafter, the base cylinder can be inserted within the template cylinder. Also, one or more stops may be provided for either cylinder so as to prevent these cylinders from moving relative to each other in the axial direction. Also, various techniques may be utilized to facilitate the rotation of the cylinders relative to each other, such as utilizing lubricants between the cylinders, incorporating ball-bearing devices, or utilizing other conventional techniques. Also, because the outer cylinder has a slightly larger diameter than the inner cylinder, it may be preferable to slightly enlarge the template windows as compared with the base portion sections, e.g., in the same ratio as the diameters of the two cylinders.

In the embodiments described above, the base is divided into a number of sections that are typically square or rectangular-shaped. However, it should be noted that the sections may have any other shape instead. Still further, it is possible to not use clearly defined sections at all, but instead to use various other printed indicia, arranged for example in any of the manners described above, to represent the notes. For example, sheet 650 in FIG. 13 could omit the vertical and horizontal lines which delineate the different sections and simply use the symbols shown in FIG. 13, arranged in the same manner, to represent the various notes, without any significant loss of functionality.

Further Comments On Utilizing Color to Teach Music

Figure 2:
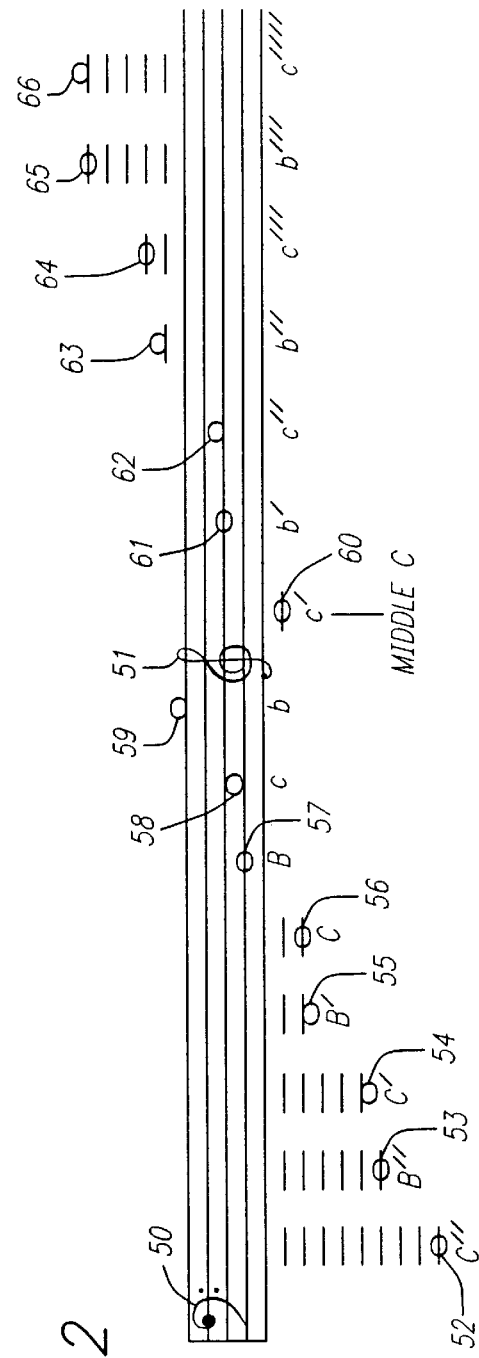
FIG. 2 shows a notation scheme for pitch.
Figure 3:
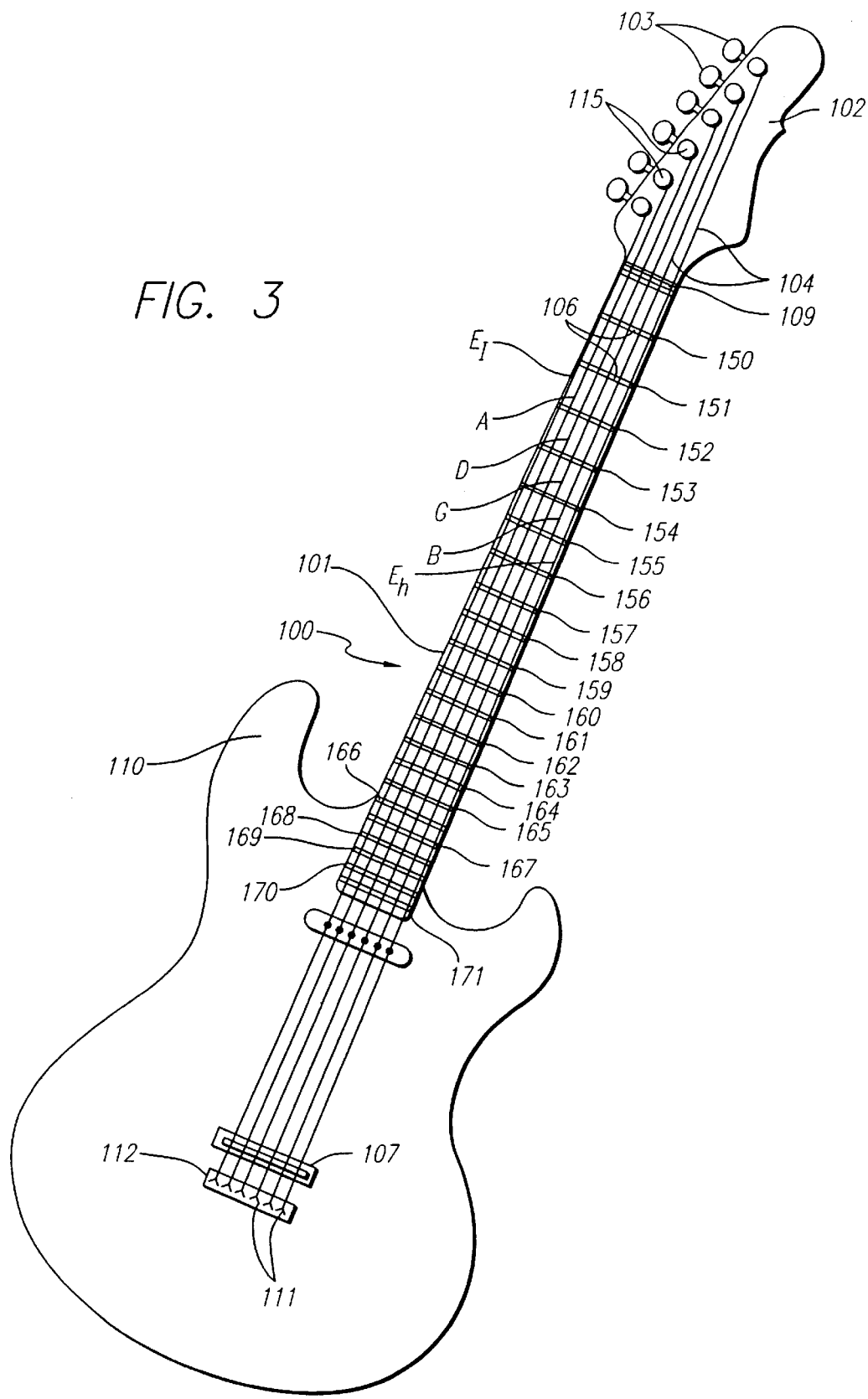
FIG. 3 shows a conventional string instrument.

Instruction can be further facilitated by also supplying a student a booklet with musical compositions wherein the notes of the musical compositions are colored in conformity with the instrument color scheme of the present invention. Accordingly, with reference to FIG. 2, the C notes 52, 54, 56, 58, 60, 62, 64 and 66 could each be colored yellow whenever included in the musical compositions. Likewise, the B notes 53, 55, 57, 59, 61, 63 and 65 could be colored orange whenever included in the musical compositions. Other diatonic notes would comprise their respective colors. With respect to chromatic notes, it is suggested that the "note" symbol of the musical notation comprise the color of the diatonic note shown and the sharp symbol (♯) or flat symbol (♭) remain black.

Applicant is aware of two prior art devices which have colored keys. Both of these prior art devices differ from the present invention in several significant respects. The first item is the "Fisher-Price Grand Piano." This is a toy piano comprising eight keys, C, D, E, F, G, A, B and C. Each key comprises a different color. One C key is colored lavender while the other C key is colored red. Therefore, the colors are utilized inconsistently, contrary to the teachings of this application. According to the present invention, it would be expected that both C keys would be the same color.

Further, the toy piano does not comprise chromatic keys. This is an important distinction. A toy generally will not have chromatic keys, but a serious musical instrument generally will have means to play chromatic notes.

The second prior art device is a "My Song Maker Electronic Singalong Guitar." This device is a toy "guitar" (it is in the shape of a guitar) comprising 13 round buttons for playing notes G, A, B, C, D, E, F, G, A, B, C, D, E. There are no strings. The buttons are the colors set forth in Table 10 below.

TABLE 10

| NOTE | COLOR |
|---|---|
| G | RED |
| A | BLUE |
| B | YELLOW |
| C | GREEN |
| D | PURPLE |
| E | RED |
| F | BLUE |
| G | YELLOW |
| A | GREEN |
| B | PURPLE |
| C | RED |
| D | BLUE |
| E | YELLOW |

Therefore, as with the first prior art device, the colors are used inconsistently (e.g., one C button is green and the other is red) and there are no means for playing chromatic tones.

Conclusion

Several different embodiments of the present invention are described above, with each such embodiment described as including certain features. However, it is intended that the features described in connection with the discussion of a single embodiment are not limited to that embodiment but may be included and/or arranged in various combinations in any of the other embodiments as well, as will be understood those skilled in the art.

Moreover, although the present invention has been described in detail with regard to the exemplary embodiments and drawings thereof, it should be apparent to those skilled in the art that various adaptations and modifications of the present invention may be accomplished without departing from the spirit and the scope of the invention. Accordingly, the invention is not limited to the precise embodiment shown in the drawings and described in detail herein above. Rather, it is intended that all such variations not departing from the spirit of the invention be considered as within the scope thereof as limited solely by the claims appended hereto.

In the following claims, those elements which do not include the words "means for" are intended not to be interpreted under 35 U.S.C. § 112 ¶6.

What is claimed is:

1. An apparatus for identifying desired combinations of musical notes, said apparatus comprising:
    a base imprinted with plural different indicia, each said different indicium corresponding to a different musical note; and
    a template having plural windows,
    wherein said template may be disposed over said base so as to selectively view plural of said different indicia, wherein said template corresponds to a characteristic, wherein different positions of said template relative to said base reveal different sets of musical notes having said characteristic, wherein said template can be replaced with a second template that corresponds to a second characteristic, and wherein different positions of said second template relative to said base reveal different sets of musical notes having said second characteristic.

2. An apparatus according to claim 1, wherein said characteristic is a type of musical scale.

3. An apparatus according to claim 2, wherein different positions of said template relative to said base reveal different major scales.

4. An apparatus according to claim 2, wherein different positions of said template relative to said base reveal different minor scales.

5. An apparatus according to claim 1, wherein the indicia are arranged on said base such that the corresponding musical notes are arranged cyclically in order of increasing pitch.

6. An apparatus according to claim 5, wherein said indicia are arranged side-by-side and together represent more than a full octave of musical notes.

7. An apparatus according to claim 5, wherein said indicia are arranged in a ring and together represent at least a full octave of musical notes.

8. An apparatus according to claim 1, wherein the musical note corresponding to a particular indicium can be identified by color of said particular indicium.

9. An apparatus according to claim 1, wherein the different sets of musical notes having said characteristic are revealed by moving the template linearly relative to said base.

10. An apparatus according to claim 1, wherein the different sets of musical notes having said characteristic are revealed by rotating the template relative to said base.

11. An apparatus according to claim 1, wherein said characteristic is a type of chord.

12. An apparatus according to claim 11, wherein different positions of said template relative to said base reveal different major chords.

13. An apparatus according to claim 11, wherein different positions of said template relative to said base reveal different minor chords.

14. An apparatus according to claim 1, wherein said template includes plural sets of windows, each of said plural sets corresponding to a different characteristic.

15. An apparatus according to claim 14, wherein the different characteristics are different types of musical scales.

16. An apparatus according to claim 14, wherein the different characteristics are different types of musical chords.

17. An apparatus according to claim 1, wherein said template is attached to said base.

18. An apparatus according to claim 17, wherein said template is attached to said base so as to permit said template to move linearly relative to said base.

19. An apparatus according to claim 1, wherein said template is attached to said base so as to permit said template to rotate relative to said base.

20. An apparatus according to claim 1, wherein the indicia are arranged such that the musical notes corresponding to any two adjacent indicia are one half step apart.

21. An apparatus according to claim 1, wherein each shift on the base to a next indicium in a rightward direction results in a same first number of step changes in the corresponding musical notes, and wherein each shift on the base to a next indicium in an upward direction results in a same second number of step changes in the corresponding musical notes.

22. An apparatus according to claim 1, wherein said first number and said second number are one half step.

* * * * *